(12) United States Patent
Sasaki

(10) Patent No.: US 7,224,397 B2
(45) Date of Patent: May 29, 2007

(54) AF CONTROL APPARATUS AND AF CONTROL METHOD

(75) Inventor: Gen Sasaki, Osaka (JP)

(73) Assignee: Mega Chips Corporation, Osaka (JP)

( * ) Notice: Subject to any disclaimer, the term of this patent is extended or adjusted under 35 U.S.C. 154(b) by 675 days.

(21) Appl. No.: 10/228,918

(22) Filed: Aug. 28, 2002

(65) Prior Publication Data

US 2003/0043290 A1  Mar. 6, 2003

(30) Foreign Application Priority Data

Aug. 29, 2001 (JP) .............................. 2001-259519

(51) Int. Cl.
H04N 5/232 (2006.01)

(52) U.S. Cl. ............ 348/348; 348/208.99; 348/208.12; 348/349

(58) Field of Classification Search ........... 348/208.12, 348/345, 208.99, 348, 349
See application file for complete search history.

(56) References Cited

U.S. PATENT DOCUMENTS

| | | | |
|---|---|---|---|
| 4,623,237 A | | 11/1986 | Kaneda et al. |
| 4,870,442 A | | 9/1989 | Tejima et al. |
| 4,954,861 A | * | 9/1990 | Nagaoka et al. ............. 396/109 |
| 5,204,749 A | * | 4/1993 | Toyama et al. ............. 348/352 |
| 5,317,142 A | | 5/1994 | Noda et al. |
| 5,526,088 A | * | 6/1996 | Kusaka ......................... 396/96 |
| 5,583,603 A | * | 12/1996 | Hirasawa et al. ........... 396/135 |
| 5,808,726 A | * | 9/1998 | Egawa et al. ............. 356/3.06 |
| 5,848,305 A | * | 12/1998 | Takasaki ....................... 396/96 |
| 5,850,282 A | * | 12/1998 | Egawa ....................... 356/3.08 |
| 5,870,178 A | * | 2/1999 | Egawa et al. ............. 356/3.03 |
| 6,094,223 A | * | 7/2000 | Kobayashi ................... 348/354 |
| 6,124,890 A | * | 9/2000 | Muramoto ................... 348/345 |
| 6,693,672 B1 | * | 2/2004 | Oliver ......................... 348/345 |
| 6,864,915 B1 | * | 3/2005 | Guimaraes et al. ......... 348/222.1 |

(Continued)

FOREIGN PATENT DOCUMENTS

JP       6-137863      5/1994

(Continued)

OTHER PUBLICATIONS

"The Authoritative Dictionary of IEEE Standards and Terms: Seventh Edition", Dec. 2000, The Institute of Electrical ane Electronics Engineers, p. 587.*

*Primary Examiner*—Tuan Ho
*Assistant Examiner*—Chriss S. Yoder
(74) *Attorney, Agent, or Firm*—Oblon, Spivak, McClelland, Maier & Neustadt, P.C.

(57) ABSTRACT

A CPU performs a control for photographing a main subject in absence of auxiliary light, whereby an image signal is outputted from an analogue signal processing section. Next, the CPU performs a control for photographing the main subject in presence of the auxiliary light, whereby an image signal is outputted from the analogue signal processing section. An AF area extracting section extracts image signals in an AF area from the image signals. A differential signal calculating section outputs a differential signal between the extracted image signal, and a distance measuring section compares magnitudes of that differential signal and a reference value in a distance data base to calculate distance information based on the comparison result. An AF control section executes AF control of mountain climbing system with the use of the distance information.

9 Claims, 18 Drawing Sheets

U.S. PATENT DOCUMENTS 6,930,717 B1 * 8/2005 Kobayashi et al. .... 348/333.02
2001/0010556 A1 * 8/2001 Sugimoto et al. ........... 348/345

FOREIGN PATENT DOCUMENTS

| JP | 6-160088 | 6/1994 |
| JP | 7-229735 | 8/1995 |
| JP | 2000-89092 | 3/2000 |
| JP | 2001-141984 | 5/2001 |
| JP | 2001-148867 | 5/2001 |
| JP | 2001-165655 | 6/2001 |
| JP | 2002-341235 | 11/2002 |

* cited by examiner

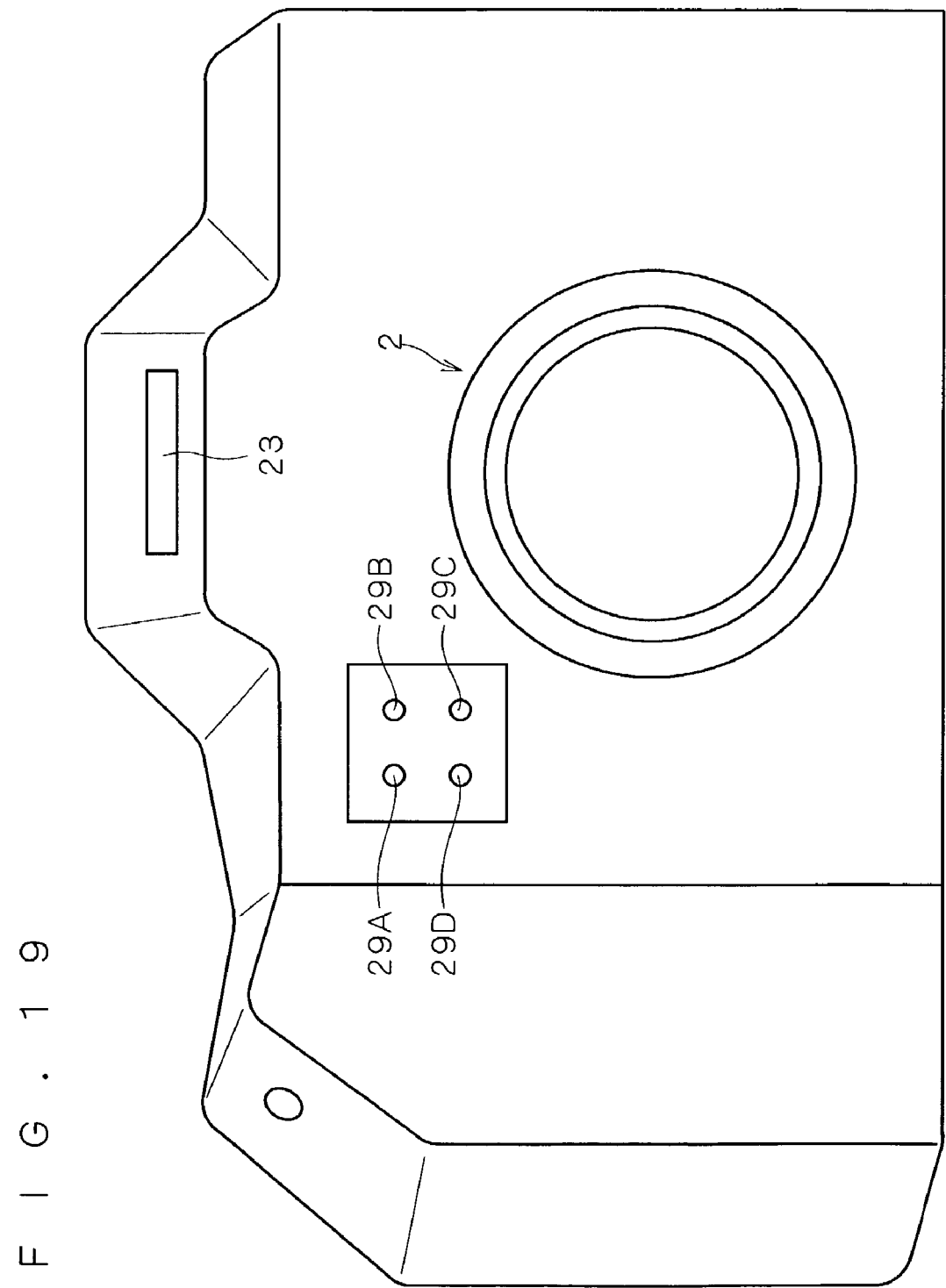

AF CONTROL APPARATUS AND AF CONTROL METHOD

BACKGROUND OF THE INVENTION

1. Field of the Invention

The present invention relates to an AF control apparatus which illuminates a subject with an auxiliary light, receives a reflection light from the subject to calculate distance information to the subject, and executes AF (automatic focusing) control, and an AF control method.

2. Description of the Background Art

In digital cameras such as digital video cameras and digital still cameras, light that has passed through an optical system having a variety of lens, for example, and formed an image (hereinafter, referred to as TTL light; TTL is an abbreviation for "through the lens.") is detected by an image pickup sensor having an image pickup device such as CCD and CMOS, and subjected to various image processings after converted to a digital image signal (raw image data) by A/D conversion. The image data having subjected to these image processings is then displayed on an EVF (electronic view finder) or subjected to compression coding to be stored in a memory card, for example.

As an AF control system employed in digital cameras, a so-called "mountain climbing system" using TTL light is common which executes AF control in the manner as follows. An AF control mechanism mounted in a digital camera first extracts high frequency components Gh of the above-described digital image signal in a given AF area, and calculates a sum $S_0$ of the same for storage. Next, the AF control mechanism calculates a sum $S_1$ of high frequency components Gh' after driving an optical system for moving the lens by a predetermined interval in one direction along the optical axis, and compares the sum $S_1$ with the sum $S_0$ previously calculated. When the sum $S_1$ is larger than the sum $S_0$ previously calculated, it is determined that the lens has moved close to a focusing position, and the lens is moved in the same direction. On the other hand, when the sum $S_1$ is smaller than the sum $S_0$, it is determined that the lens has moved away from the focusing position, and the lens is moved in the opposite direction. In this manner, the AF control mechanism drives the optical system until the sum of the high frequency components reaches near the maximum value and hence the image surface substantially coincides with the focusing surface. The driving method of optical system as described above is called a perturbation method. In other driving method which is called a full-range scanning method, the AF control mechanism moves the focal point of the lens from the minimum end to the infinite end across the full range while stopping the same little by little, and calculates a sum of the high frequency components at every stop position and stores the sum. Then, the AF control mechanism judges the lens position that corresponds to the value near the maximum value among the sums thus stored as a focusing position, and performs a control so as to move the lens to this focusing position. It is to be noted that in place of utilizing sums of high frequency components in the AF area, the maximum value of high frequency component in the same AF area may be utilized in some cases.

In general, the above-described mountain climbing system has a disadvantage that the time required for focusing (focusing time) is long while having an advantage of high AF accuracy.

Furthermore, in the case where a subject which is located at a short distance and contains less high frequency components and a subject which is located at a long distance and contains more high frequency components exist in the same AF area, the latter subject is more likely to become in focus. However, the main subject on which it is intended to focus is often located at a short distance, and in such a case, an out-of-focus background such that the background of the main subject is in focus will occur. Furthermore, in the case where these subjects are substantially the same in contrast, such a problem is posed that the position of focal point keeps transiting between the subject at a short distance and the subject at a long distance and hence the AF process will never end.

SUMMARY OF THE INVENTION

For solving the above problem, according to a first aspect of the present invention, an AF control apparatus for executing AF (automatic focusing) control of an optical system mounted in a camera, includes an image pickup sensor for detecting an incident light from a subject, a light source for emitting an auxiliary light to the subject, a differential signal calculating section for outputting a differential signal between a first image signal which is obtained by image pickup by the image pickup sensor when the light source does not emit the auxiliary light, and a second image signal which is obtained by image pickup by the image pickup sensor when the light source emits the auxiliary light, a distance measuring section for calculating distance information to the subject based on the differential signal, and an AF control section for controlling an AF operation of the optical system based on the distance information.

The invention according to a second aspect is the AF control apparatus according to the first aspect, wherein the distance measuring section compares a brightness value of the differential signal with a reference value in correspondence with the distance information to the subject, to thereby calculate the distance information.

The invention according to a third aspect is the AF control apparatus according to the first aspect, wherein the distance measuring section calculates the distance information under the condition that a reflectance of the subject is uniform and that intensity of the auxiliary light attenuates in accordance with the inverse-square law.

The invention according to a fourth aspect is the AF control apparatus according to the first aspect, further including a reflectance calculating section for calculating a reflectance of the subject based on the first image signal, wherein the distance measuring section calculates the distance information using the reflectance calculated at the reflectance calculating section under the condition that intensity of the auxiliary light attenuates in accordance with the inverse-square law.

The invention according to a fifth aspect is the AF control apparatus according to the fourth aspect, wherein the reflectance calculating section includes means for calculating an average brightness of one frame of the first image signal and an average brightness of a given AF area set for the one frame, and means for calculating the reflectance corresponding to the average brightness of the AF area using a predetermined reference reflectance in corresponding with the average brightness of one frame.

The invention according to a sixth aspect is the AF control apparatus according to the fourth aspect, including a data base for storing a probability of occurrence of an event that an image area having a given image size includes a shade part, wherein the probability of occurrence has two variables: average brightness of a center part in the image area;

and average brightness of a peripheral part, and the reflectance calculating section includes means which calculates an average brightness of the center part and an average brightness of the peripheral part of the image area included in the AF area, and means which acquires the probability of occurrence having the average brightnesses as the two variables from the data base and corrects the reflectance based on the probability of occurrence.

The invention according to a seventh aspect is the AF control apparatus according to the first aspect, wherein the light source is composed of a plurality of light sources which are spatially arranged across a direction crossing to an optical axis of the optical system and emit the auxiliary light with directivity to illuminate the subject, and the distance measuring section calculates the distance information based on a peak-to-peak distance in distribution of quantity of light obtained from the differential signal.

The invention according to an eighth aspect is the AF control apparatus according to the first aspect, wherein the light source is composed of a plurality of light sources which are spatially arranged across a direction crossing to an optical axis of the optical system and emit the auxiliary light with directivity to illuminate the subject, and the distance measuring section detects a spatial frequency corresponding to a peak-to-peak distance in distribution of quantity of light based on a spatial frequency spectrum which can be obtained by performing orthogonal transformation on the distribution of quantity of light obtained from the differential signal, and calculates the distance information based on the peak-to-peak distance.

The invention according to a ninth aspect is the AF control apparatus according to the first aspect, wherein the AF control section executes AF control of a mountain climbing system by using the distance information calculated at the distance measuring section.

The invention according to a tenth aspect is the AF control apparatus according to the first aspect, wherein an AF area is set for one frame of the image signal, and the distance measuring section calculates the distance information while removing a low brightness region having a brightness value of less than a predetermined threshold, from the differential signal in the AF area.

The invention according to an eleventh aspect is the AF control apparatus according to the first aspect, wherein a plurality of AF areas which are selectable are set for one frame of the image signal, and the distance measuring section calculates the distance information while preferentially selecting the AF area having high brightness component of the differential signal among the plurality of AF areas.

The invention according to a twelfth aspect is the AF control apparatus according to the first aspect, wherein an AF area is set for one frame of the image signal, and the distance measuring section calculates the distance information while removing a high brightness region having a brightness value of a predetermined threshold or more which is associated with a short distance, from the differential signal in the AF area.

The invention according to a thirteenth aspect is the AF control apparatus according to the twelfth aspect, wherein the distance measuring section removes the high brightness region from a differential signal when a maximum brightness value of the differential signal of the AF area is not less than the predetermined threshold.

The invention according to a fourteenth aspect is the AF control apparatus according to the first aspect, wherein an AF area is set for one frame of the image signal, and the distance measuring section calculates the distance information while removing a high brightness region having a brightness value of a predetermined threshold or more which is associated with a shade part, from the differential signal in the AF area.

The invention according to a fifteenth aspect is the AF control apparatus according to the first aspect further including means for detecting a low brightness region having a brightness value of less than a predetermined threshold out of an AF area set for one frame of the first image signal, wherein the distance measuring section calculates the distance information based on the AF area after removal of the low brightness region.

The invention according to a sixteenth aspect is the AF control apparatus according to the first aspect, wherein a plurality of AF area which are selectable are set for one frame of the image signal, and the distance measuring section selects other the AF areas when a maximum brightness value of the differential signal in selected one of the AF areas is a predetermined threshold or less.

According to a seventeenth aspect of the present invention, an AF control method for executing AF (automatic focusing) control of an optical system mounted in a camera, includes the steps of (a) detecting an incident light from a subject by an image pickup sensor without emitting an auxiliary light to the subject, thereby obtaining a first image signal, (b) detecting the incident light from the subject by the image pickup sensor when the auxiliary light is emitted to the subject, thereby obtaining a second image signal, (c) calculating a differential signal between the first image signal and the second image signal, (d) calculating distance information to the subject based on the differential signal, and (e) controlling an AF operation of the optical system based on the distance information calculated in the step (d).

The invention according to an eighteenth is the AF control method according to the seventeenth aspect, wherein the step (d) is a step of calculating the distance information by comparing a brightness value of the differential signal with a reference value in correspondence with the distance information to the subject.

The invention according to a nineteenth aspect is the AF control method according to the seventeenth aspect, wherein the step (d) is a step of calculating the distance information under the condition that a reflectance of the subject is uniform and that intensity of the auxiliary light attenuates in accordance with the inverse-square law.

The invention according to a twentieth aspect is the AF control method according to the seventeenth aspect, further including a step of (f) calculating a reflectance of the subject based on the first image signal after the step (a), wherein the step (d) is a step of calculating the distance information using the reflectance calculated at the step (f) and under the condition that intensity of the auxiliary light attenuates in accordance with the inverse-square law.

The invention according to a twenty-first aspect is the AF control method according to the twentieth aspect, wherein the step (f) includes the steps of: calculating an average brightness of one frame of the first image signal and an average brightness of a given AF area set for the one frame; and calculating the reflectance corresponding to the average brightness of the AF area using a predetermined reference reflectance in corresponding with the average brightness of one frame.

The invention according to a twenty-second aspect is the AF control method according to the twentieth aspect, wherein a data base for storing a probability of occurrence of an event that an image area having a given image size includes a shade part is prepared, the probability of occurrence having two variables: average brightness of a center part in the image area; and average brightness of a peripheral part, and the step (f) includes the steps of: calculating an average brightness of the center part and an average brightness of the peripheral part of the image area included in the AF area; and acquiring the probability of occurrence having the average brightnesses as two variables from the data base, thereby correcting the reflectance based on the probability of occurrence.

The invention according to a twenty-third aspect is the AF control method according to the seventeenth aspect, wherein the step (b) is a step of obtaining the second image signal by emitting the auxiliary light with directivity to illuminate the subject from a plurality of light sources, and the step (d) is a step of calculating the distance information based on a peak-to-peak distance in distribution of quantity of light obtained from the differential signal calculated at the step (c).

The invention according to a twenty-fourth aspect is the AF control method according to the seventeenth aspect, wherein the step (b) is a step of obtaining the second image signal by emitting the auxiliary light with directivity from a plurality of light sources to illuminate the subject, and the step (d) is a step of detecting a spatial frequency corresponding to a peak-to-peak distance in distribution of quantity of light based on a spatial frequency spectrum which can be obtained by performing orthogonal transformation on the distribution of quantity of light obtained from the differential signal calculated the in the step (c) to calculate the distance information based on the peak-to-peak distance.

The invention according to a twenty-fifth aspect is the AF control method according to the seventeenth aspect, wherein the step (e) is a step of executing AF control of a mountain climbing system by using the distance information calculated in the step (d).

The invention according to a twenty-sixth aspect is the AF control method according the seventeenth aspect, wherein the step (d) is a step of calculating the distance information while removing a low brightness region having a brightness value of less than a predetermined threshold, from the differential signal in an AF area set for one frame of the image signal.

The invention according to a twenty-seventh aspect is the AF control method according to the seventeenth aspect, wherein a plurality of AF areas which are selectable are set for one frame of the image signal, and the step (d) is a step of calculating the distance information while preferentially selecting the AF area having high brightness component of the differential signal among the plurality of AF areas.

The invention according to a twenty-eighth aspect is the AF control method according to the seventeenth aspect, wherein the step (d) is a step of calculating the distance information while removing a high brightness region having a brightness value of a predetermined threshold or more which is associated with a short distance, from the differential signal in an AF area set for one frame of the differential signal.

The invention according to a twenty-ninth aspect is the AF control method according to the twenty-eighth aspect, wherein in the step (d), when a maximum brightness value of the differential signal is the predetermined threshold or more, the high brightness region is removed from the AF area.

The invention according to a thirtieth aspect is the AF control method according to the seventeenth aspect, wherein the step (d) is a step of calculating the distance information while removing a high brightness region having a brightness value of a predetermined threshold or more which is associated with a shade part from the differential signal in an AF area set for one frame of the image signal.

The invention according to a thirty-first aspect is the AF control method according to any one of the seventeenth to twenty-fifth aspects of the present invention, further including a step of (g) detecting a low brightness region having a brightness value of less than a predetermined threshold from an AF area set for one frame of the first image signal, after the step (a), wherein the step (d) is a step of calculating the distance information based on the AF area after removal of the low brightness region.

The invention according to a thirty-second aspect is the AF control method according to the seventeenth aspect, wherein a plurality of AF area which are selectable are set for one frame of the image signal, and in the step (d), when a maximum brightness value of the differential signal in selected one of the AF areas is a predetermined threshold or less, other the AF area is selected.

As described above, in accordance with the AF control apparatus according to the first aspect and the AF control method according to the seventeenth aspect of the present invention, a differential signal between an image signal in presence of auxiliary light and an image signal in absence of auxiliary light is used, and the differential signal includes only the reflected light of the auxiliary light reflected by a subject or background thereof with information of reflected light of natural light reflected by the subject or background thereof being removed. By using this differential signal, it is possible to calculate approximate distance information to the subject with relatively high accuracy. Moreover, it becomes possible to carry out the AF control so as to drive the above optical system in a focusing condition or near focusing condition in a short time by utilizing the distance information.

In accordance with the second and the eighteenth aspects, it is possible to calculated approximate distance information to the subject in a short time using the above reference value for use in AF control.

In accordance with the third and nineteenth aspects, by utilizing the fact that the auxiliary light emitted from the light source attenuates in accordance with the inverse-square law, it is possible to calculate the approximate distance information uniquely and in a short time.

In accordance with the fourth and the twentieth aspects, it is possible to calculates different reflectance depending on the subject by means of the above reflectance calculating section, and using this reflectance and the fact that the auxiliary light emitted from the light source attenuates in accordance with the inverse-square law, it is possible to calculate the distance information to the subject accurately for use in AF control.

In accordance with the fifth and the twenty-first aspects, since the reflectance of the AF area can be accurately calculated, the accuracy of the distance information to the subject improves, and AF control can be executed more quickly.

In accordance with the sixth and the twenty-second aspects, even if a shade part is included in an AF area of an image signal, it is possible to obtain a reflectance wherein the influence of the shade part is removed. In general, a theoretical reflectance of a shade part of a subject is smaller than that of the part where a shade does not occur, which causes decrease in accuracy of distance information, however, this cause can be eliminated. Therefore, it is possible to improve the accuracy of the distance information.

In accordance with the seventh and the twenty-third aspects, it is possible to calculate the distance information to the subject uniquely and accurately, and use it for AF control.

In accordance with the eighth and the twenty-fourth aspects, since the peak-to-peak distance of distribution of quantity of light can be accurately calculated by using the orthogonal transformation, the accuracy of the distance information is improved.

In accordance with the ninth and the twenty-fifth aspects, the lens is moved to the position corresponding to the distance information calculated at the above distance measuring section, and the AF driving of mountain climbing system can be executed starting from that position, with the result that it is possible to reduce the focusing time and significantly improve the AF accuracy.

In accordance with the tenth and the twenty-sixth aspects, in the case where it is desired to precedently focus on the main subject at a very-close distance, it is possible to prevent an occurrence of an out-of-focus background that the background or the like located at a long distance is in focus.

In accordance with the eleventh and the twenty-seventh aspects, the AF area corresponding to the subject located at a very-close distance is precedently selected, which makes it possible to prevent an occurrence of an out-of-focus background.

In accordance with the twelfth and the twenty-eighth aspects, in the case where it is desired to precedently focus on the subject located at a long distance, it is possible to prevent a subject located at a relatively short distance from becoming in focus.

In accordance with the thirteenth and the twenty-ninth aspects, it is possible to automatically transit to the mode for precedently focusing on the subject located at a long distance.

In accordance with the fourteenth and the thirtieth aspects, although the magnitude of the differential signal at the shade part of the subject is larger than that of the part where a shade does not occur, causing deterioration of the AF accuracy, by removing the high brightness region corresponding to the shade part from the differential signal, it is possible to remove such a cause to improve the AF accuracy.

In accordance with the fifteenth and the thirty-first aspects, although the magnitude of the differential signal at the shade part of the subject is larger than that of the part where a shade does not occur, causing deterioration of the AF accuracy, by removing the low brightness region corresponding to the shade part from the first image signal, it is possible to remove such a cause to improve the AF accuracy.

In accordance with the sixteenth and the thirty-second aspects, it becomes possible to precedently select the AF area corresponding to the subject located at a very-close distance.

In consideration of the disadvantages and problems as described above, it is an object of the present invention to provide an AF control apparatus and an AF control method which are able to (1) shorten the focusing time without deteriorating the AF accuracy, and (2) focus on either subject located at a short distance or a long distance in a short time and with accuracy, when a plurality of subjects exist in one AF area.

These and other objects, features, aspects and advantages of the present invention will become more apparent from the following detailed description of the present invention when taken in conjunction with the accompanying drawings.

BRIEF DESCRIPTION OF THE DRAWINGS

FIG. 19 is a schematic view showing a digital still camera according to a modified example of the fourth embodiment which is equipped with an LED light source.

DESCRIPTION OF THE PREFERRED EMBODIMENTS

In the following, various embodiments of the present invention will be explained.

First Embodiment

Figure 1:
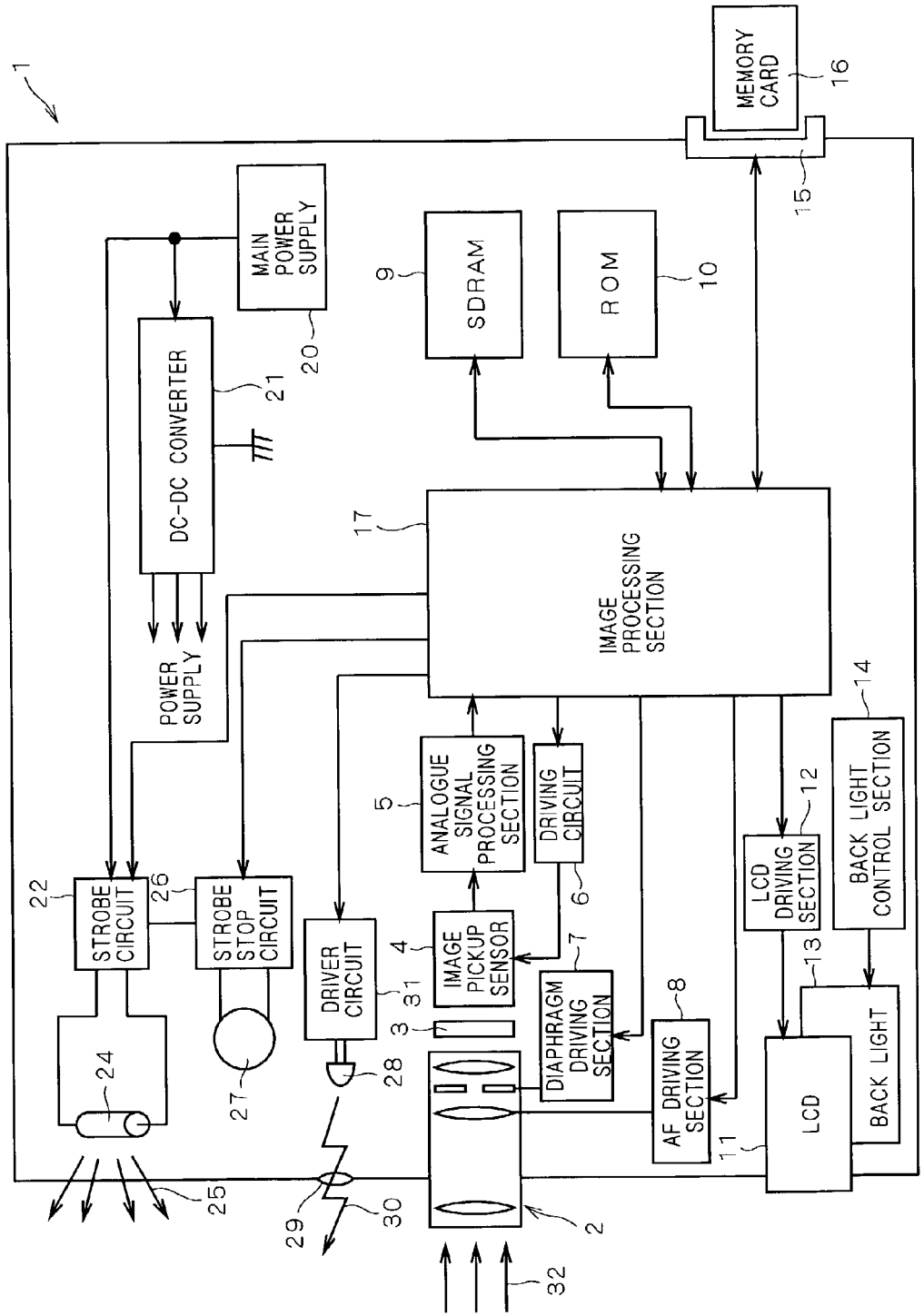
FIG. 1 is a schematic configuration view showing the entirety of a digital still camera equipped with an AF control apparatus according to the first embodiment of the present invention.

FIG. 1 is a schematic view showing the entirety of a digital still camera 1 equipped with an AF control apparatus according to the first embodiment of the present invention.

First a configuration of the digital still camera 1 is briefly explained, and then the AF control apparatus according to the first embodiment will be described in detail. The digital still camera 1 comprises: an optical mechanism 2 having lens group, a diaphragm mechanism and the like; an optical LPF (low-pass filter) 3; an image pickup sensor 4 such as CCD or CMOS; a driving circuit 6 for driving the image pickup sensor 4; an analogue signal processing section 5;

and an image processing section 17. Reflected light 32 from a subject having passed through the optical mechanism 2 and the optical LPF 3 is detected by the image pickup sensor 4 having CCD (charge-coupled device) or CMOS, and outputted to the analogue signal processing section 5.

Though not clearly shown in the drawing, the analogue signal processing section 5 is provided with a CDS (correlated double sampling) circuit, an AGC (automatic gain control) circuit, an A/D converter and the like. In general, the image pickup sensor 4 alternately outputs a reference signal having a reference level of usually a black level and an image signal including the reference level in time sharing manner. The CDS circuit samples the reference signal and the image signal inputted from the image pickup sensor 4, extracts differential signals between these two signals, and outputs the differential signals. As a result of this, it is possible to remove the noise components mixed in the analogue signals inputted from the image pickup sensor 4. The AGC circuit outputs analogue signals to the A/D converter after optimizing the levels of the signal inputted from the CDS circuit. The A/D converter samples the analogue signals inputted from the AGC circuit and outputs digital signal (image signal) which have been quantized in a predetermined quantization bit number and encoded to the image processing section 17.

The image processing section 17 has various kinds of digital circuits which conduct a gamma correction, a color space converting process, outline emphasizing process, image signal processing, compression coding process and the like on the image signals inputted from the analogue signal processing section 5, as well as a CPU for controlling peripheral circuits (not shown). Not being clearly shown in the drawing, the image processing section 17 also has an AWB (auto white balance) circuit for correcting a color temperature of an image signal to an appropriate temperature, a diaphragm control circuit for controlling a diaphragm controlling section 7 which drives a diaphragm mechanism of the optical mechanism 2, and an AF control section for controlling an AF driving section 8. A ROM 10 such as flush memory stores a database and various setting data required in the processings by the image processing section 17. Further, a SDRAM 9 is used as a work area for processings at the image processing section 17.

A DC-DC converter 21 is a power circuit which converts a voltage signal supplied from a main power supply 20 into a voltage signal required, for example, by the above-mentioned image pickup sensor 4 and the image processing section 17.

Furthermore, when the digital still camera 1 is in a finder operation state, an image signal outputted from the analogue signal processing section 5 is outputted to an LCD (liquid crystal display) 11 serving as a finder to be displayed in motion image. To be more specific, the image signal is outputted to an LCD driving section 12 after being subjected to resolution conversion in accordance with the resolution of the LCD 11 at the image processing section 17. Next, the LCD driving section 12 performs a control for writing input image data into the LCD 11 and a back light control section 14 performs a control for turning on a back light 13 in synchronization with the writing timing of the image data. A user of the digital still camera 1 makes settings of framing of the main subject, exposure adjustment and shutter speed, as well as determines the timing of exposure while visually recognizing a motion image which is finder-displayed on the LCD 11. Then, when the user presses a release button (not shown) at the moment of exposure, the image signal is subjected to the image processings in the image processing section 17, and written into a memory card 16 via a card interface 15 after encoded in the compression scheme such as JPEG (joint photographic experts group) or TIFF (tag image file format).

Furthermore, at the time of flash exposure, it is possible to emit flash light 25 for illumination to subject from an illuminator 24 in accordance with the timing of exposure by the user. A strobe circuit 22 is a circuit for controlling light emission of the illuminator 24 such as xenon lamp while recharging and utilizing a voltage signal supplied from the main power supply 20. The CPU contained in the image processing section 17 issues a trigger signal to the strobe circuit 22 when the user presses the release button (not shown). A dimmer device 27 formed of a SPC (silicone photo cell) device detects the reflected light of the flash light 25 reflected at the main subject, the background and the like and outputs detection signals thereof to a strobe stop circuit 26. The strobe stop circuit 26 integrates the detection signals, determines that the subject has been illuminated with an appropriate quantity of the flash light 25 at the point of time when the integration amount reaches a reference level, and outputs a stop signal to the strobe circuit 22. In response to the stop signal, the strobe circuit 22 stops light emission of the illuminator 24. In this manner, it is possible to automatically control the proper quantity of light emitted to the mains subject. It is to be noted that the dimmer element 27 may be arranged so as to detect the TTL light that has reflected on a photoconductive surface of the image pickup sensor 4 in place of detecting the light reflected at the subject or the background.

Figure 2:
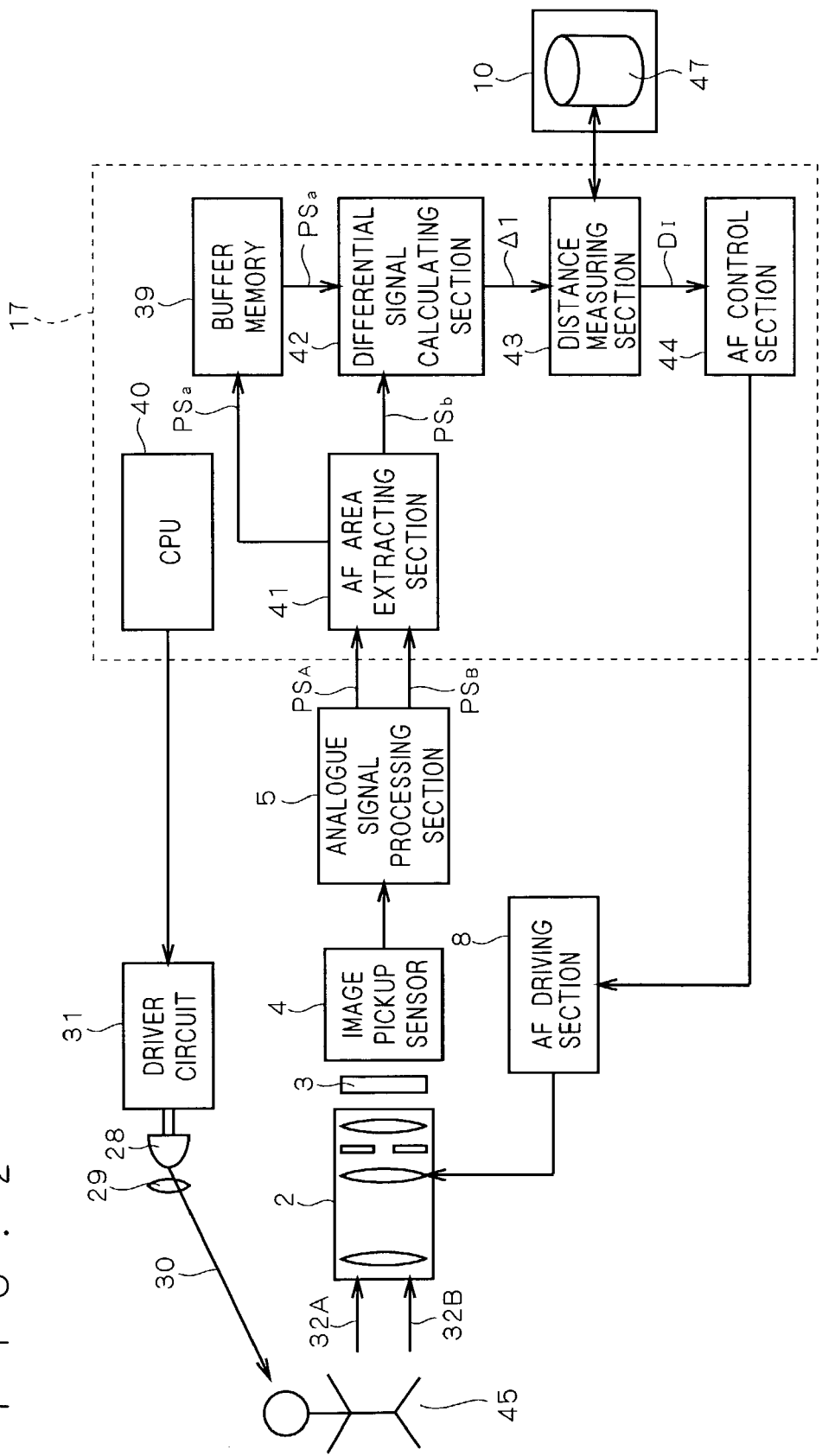
FIG. 2 is a schematic configuration view showing the AF control apparatus according to the first embodiment.
Figure 3:
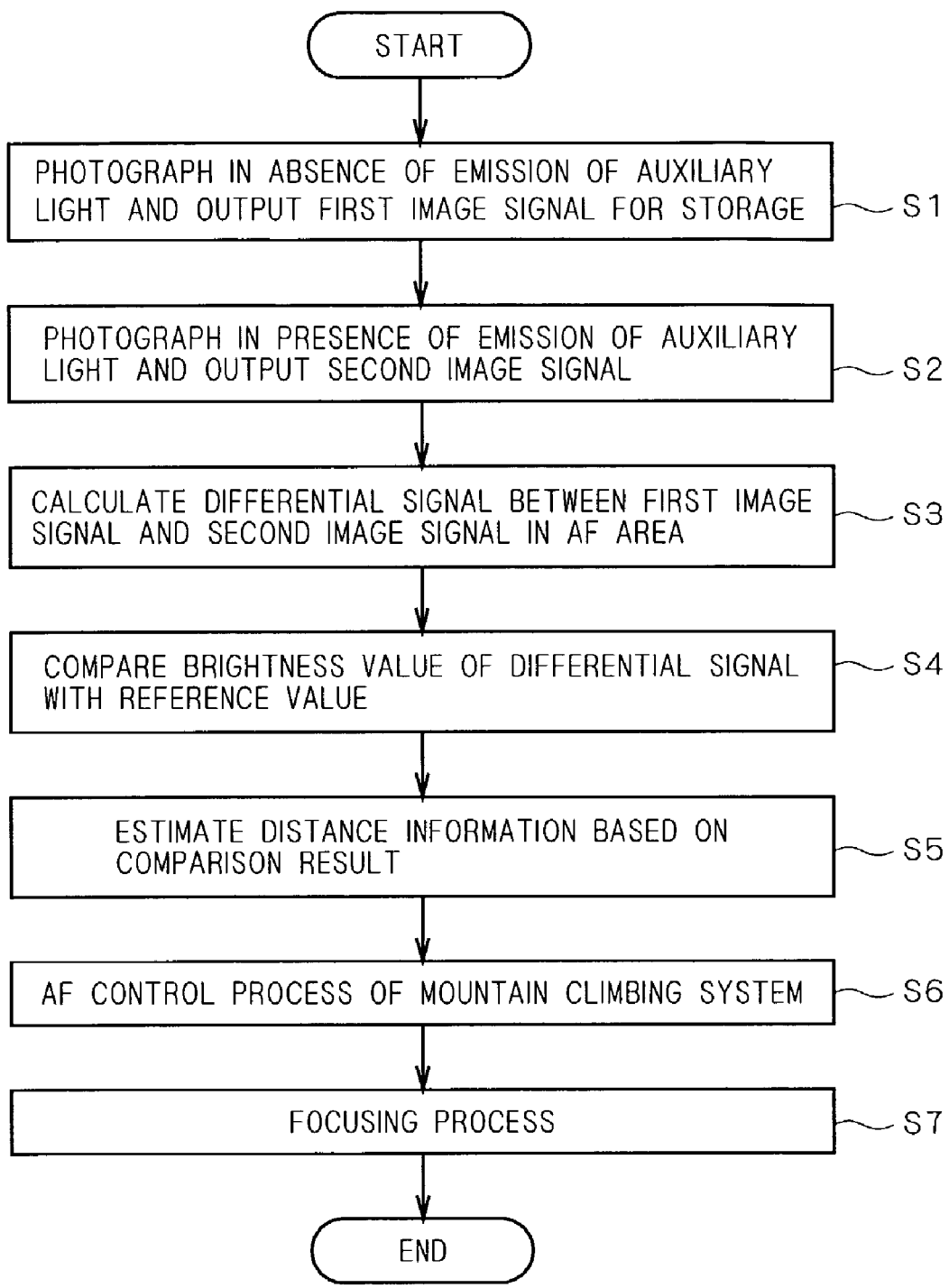
FIG. 3 is a flow chart showing an AF control method according to the first embodiment.

Next, an AF control apparatus mounted in the digital still camera 1 having the above configuration will be explained in detail. FIG. 2 is a schematic configuration view showing an AF control apparatus according to the first embodiment, and FIG. 3 is a flow chart showing an AF control method thereof. As shown in FIG. 2, the AF control apparatus according to the first embodiment comprises a buffer memory 39, an AF area extracting section 41, a differential signal calculating section 42, a distance measuring section 43, an AF control section 44 and a CPU 40. These sections 41 to 44 are incorporated into the image processing section 17 in the form of hardware or software.

Figure 4:
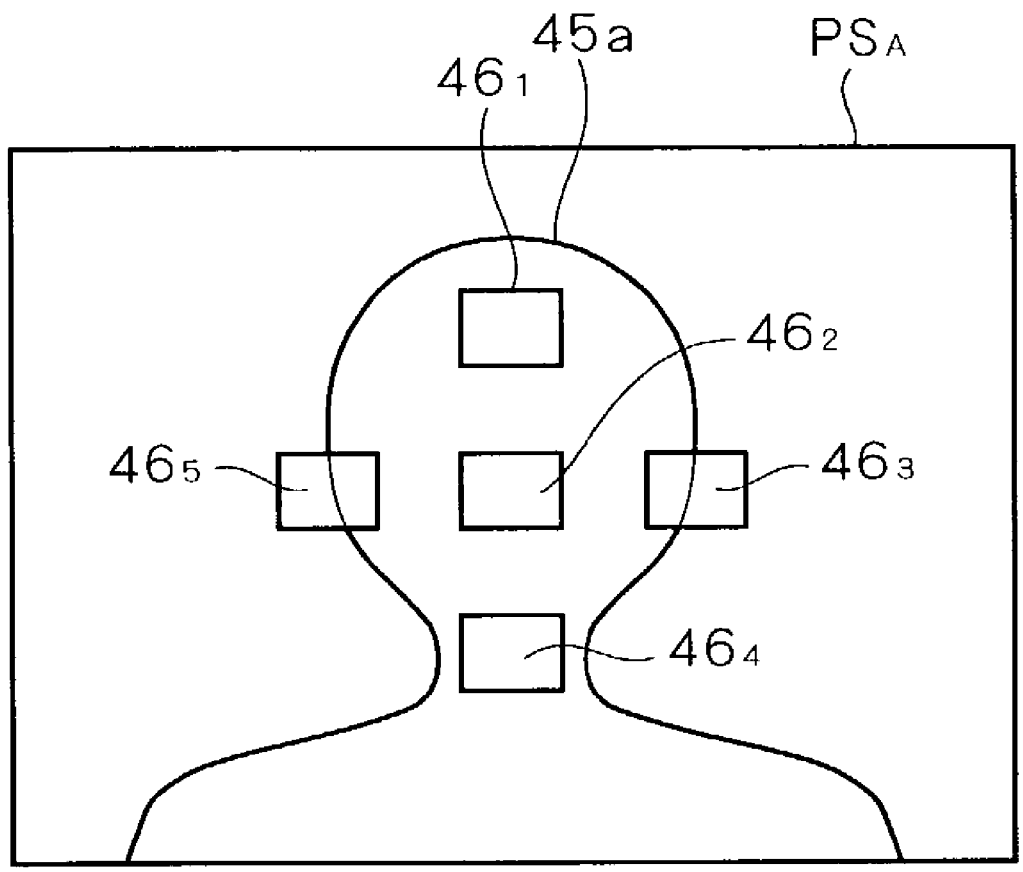
FIG. 4 is a schematic view showing examples of AF areas.

Operations of the AF control apparatus will be explained while referring to the flow chart of FIG. 3. First, at step S1, the CPU 40 performs a control for photographing a main subject 45 in absence of emission of auxiliary light 30. That is, reflected light 32A from the main subject 45 is detected by the image pickup sensor 4 after passing thorough the optical mechanism 2 and the optical LPF 3, and inputs to the image processing section 17 as an image signal $PS_A$ of one frame after being subjected to the CDS process, AGC process and A/D conversion at the analogue signal processing section 5. The AF area extracting section 41 extracts an image signal $PS_a$ in AF areas from the image signal $PS_A$, and outputs the image signal $PS_a$ to the buffer memory 39 for temporal storage. FIG. 4 is a schematic view showing examples of five AF areas $46_1$, $46_2$, $46_3$, $46_4$ and $46_5$. The user can select any one or a plurality of area(s) from the AF areas $46_1$ to $46_5$ with respect to the image signal $PS_A$ including a subject image 45a.

In the present embodiment, the buffer memory 39 is incorporated into the image processing section 17, however, not being limited to this, by utilizing an external large-capacity SDRAM 9 connected to the image processing section 17, the image signal $PS_a$ may be transferred between the SDRAM 9 and the image processing section 17 by means of, for example, a DMA (direct memory access) controller.

Next, at step S2 which is directly after step S1, the CPU 40 performs a control for photographing the main subject 45 in presence of the emission of the auxiliary light 30. That is, the CPU 40 issues to the driver circuit 31 a trigger signal for making the light source 28 emit, whereby the light source 28 emits the auxiliary light 30 to the main subject 45. The auxiliary light 30 then reflects on the subject 45 and enters the optical mechanism 2 with contained in reflected light 32B. Also the reflected light 32B is detected by the image pickup sensor 4 via the optical LPF 3 after passing through the optical mechanism 2, and inputted to the image processing section 17 as an image signal $PS_B$ of one frame after subjected to the CDS process, AGC process and A/D conversion at the analogue signal processing section 5. The AF area extracting section 41 extracts an image signal $PS_b$ of the above AF areas from the image signal $PS_B$, and outputs the image signal $PS_B$ to the differential signal calculating section 42.

At next step S3, the differential signal calculating section 42 reads the image signal $PS_a$ stored in the buffer memory 39 in synchronization with input of the image signal $PS_b$, namely signal reading from the image pickup sensor 4, and calculates in real time a differential signal $\Delta 1$ wherein the image signal $PS_a$ and the image signal $PS_b$ are differentiated in pixels, and outputs the differential signal $\Delta 1$ to the distance measuring section 43. Since the above described image signals $PS_A$ and $PS_B$ are signals that are obtained by continuous exposure in a short time, it can be understood that the image signal $PS_B$ in presence of emission of the auxiliary light 30 includes image information of the image signal $PS_A$ in absence of the emission. Accordingly, the differential signal between two image signals $PS_A$ and $PS_B$ includes information only on the light that the auxiliary light 30 is reflected on the main subject 45 or the background thereof. In the present embodiment, only the image signal $PS_a$ is stored in the buffer memory 39, however, the differential signal $\Delta 1$ may be calculated after storing both of the image signals $PS_a$ and $PS_b$ in the buffer memory, alternatively. In such a case, since it is not necessary to read out the image signal $PS_a$ from the buffer memory 39 in synchronization with signal reading from the image pickup sensor 4, it is possible to achieve the calculating of the differential signal $\Delta 1$ by software.

At next step S4, the distance measuring section 43 compares the magnitudes of an average value L1 of input differential signal $\Delta 1$ and a plurality of reference values $R_1, \ldots, R_n$ (n is an integer of 1 or more) that are prepared in advance, and calculates a comparison result representing the inequality in magnitude. For example, a comparison result representing that the average value L1 is between the reference value $R_3$ and the reference value $R_4$ is calculated.

The ROM 10 stores a distance database 47 having distance information $D_1, \ldots, D_n$ corresponding to the respective reference values $R_1, \ldots, R_n$. At next step S5, the distance measuring section 43 determines distance information $D_1$ based on the comparison result calculated at previous step S4 while referring to the distance data base 47, and outputs the distance information $D_1$ to the AF control section 44. For example, in the case where the average value L1 of brightness value is between the reference values $R_3$ and $R_4$, the distance information $D_3$ corresponding to the reference value $R_3$ is 4 meters, and the distance information $D_4$ corresponding to the reference value $R_4$ is 5 meters, the distance information $D_1$ will be determined to either one of 4 meters ($=R_3$), 5 meters ($R_4$) or 4.5 meters (intermediate value between $R_3$ and $R_4$).

At next step S6, the AF control section 44 executes AF control of mountain climbing system by using the distance information $D_1$ input from the distance measuring section 43. That is, the AF control section 44 controls the AF driving section 8, thereby driving the optical mechanism 2 and moving the lens to a position corresponding to the distance information $D_1$. Next, the AF control section 44 executes AF control of the above-described mountain climbing system starting from this lens position until the image surface nearly coincides with the focusing surface. Finally, as the lens position reaches near the focusing position at step S7, the CPU 40 detects that condition, and makes the LCD 11 serving as a finder display a focus mark.

Therefore, by means of the AF control apparatus according to the first embodiment as described above, it is possible to calculate the distance information $D_1$ to the subject in a short time using the differential signal obtained from the image signal in presence of the auxiliary light and the image signal in absence of the auxiliary light, and move the lens of the optical mechanism 2 to the focusing position or to the position near the focusing position using this distance information $D_1$. There is also the case that adopting of the mountain climbing system is not necessary if the AF control consists of several steps. Further, when the distance information of such a case is utilized in the AF control of mountain climbing system, the AF control starting from the lens position corresponding to the distance information $D_1$ is enabled, so that it is possible to significantly reduce the focusing time in comparison with the conventional mountain climbing system.

Second Embodiment

Next, the second embodiment of the present invention will be explained. In the above first embodiment 1, since the distance information $D_1, \ldots, D_n$ stored in the distance data base 47 is calculated under the condition that the reflections of the subject and the background are constant (average (usual) reflectance), it is difficult to obtain correct distance information $D_1$ when the main subject does not have an average reflectance. For solving this problem, the AF control apparatus according to the second embodiment provides means for automatically calculating the reflectance of the subject or the background, as well as provides distance measuring means not relying on the above distance data base 47.

Figure 5:
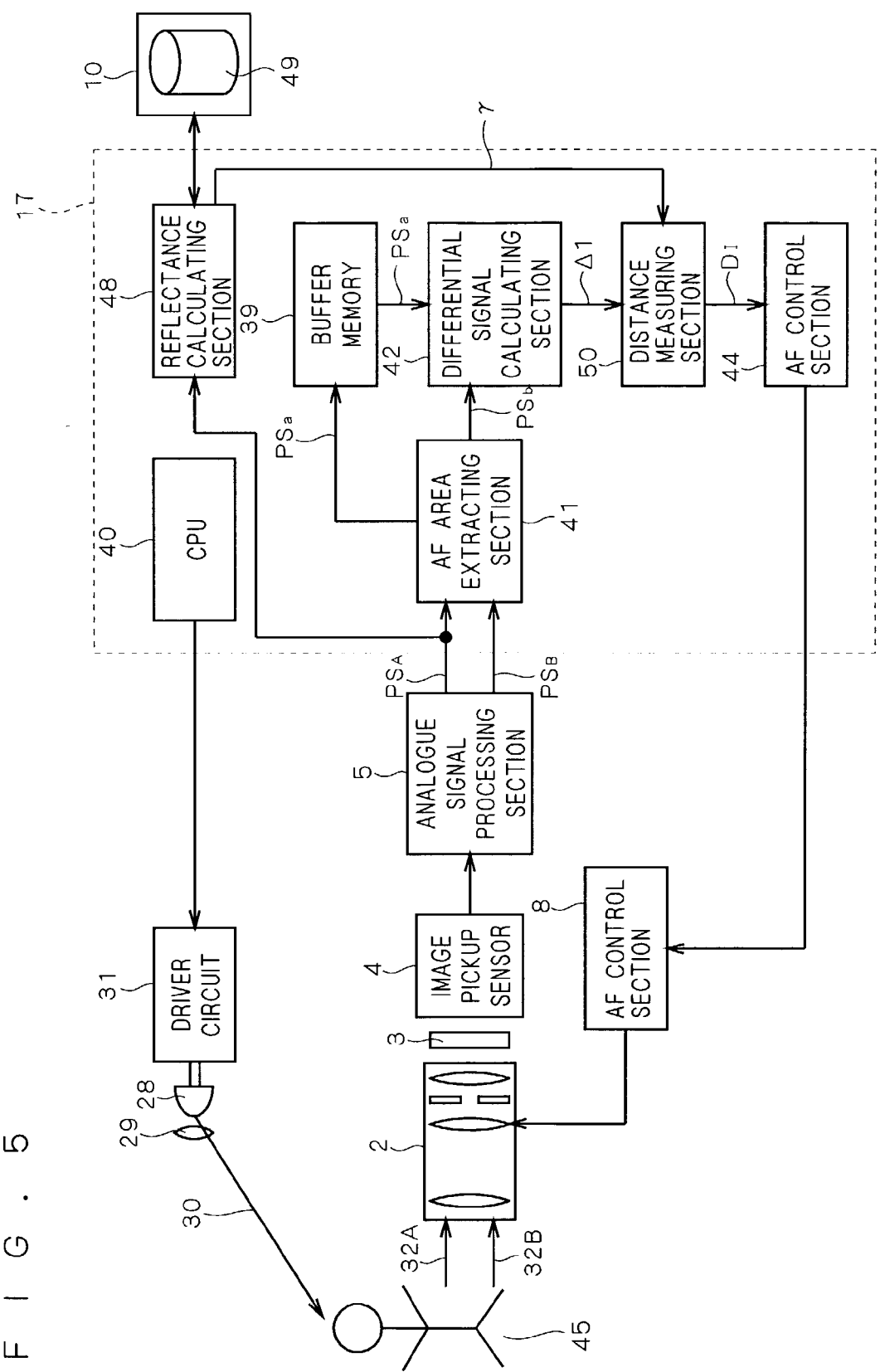
FIG. 5 is a schematic configuration view showing an AF control apparatus according to the second embodiment of the present invention.
Figure 6:
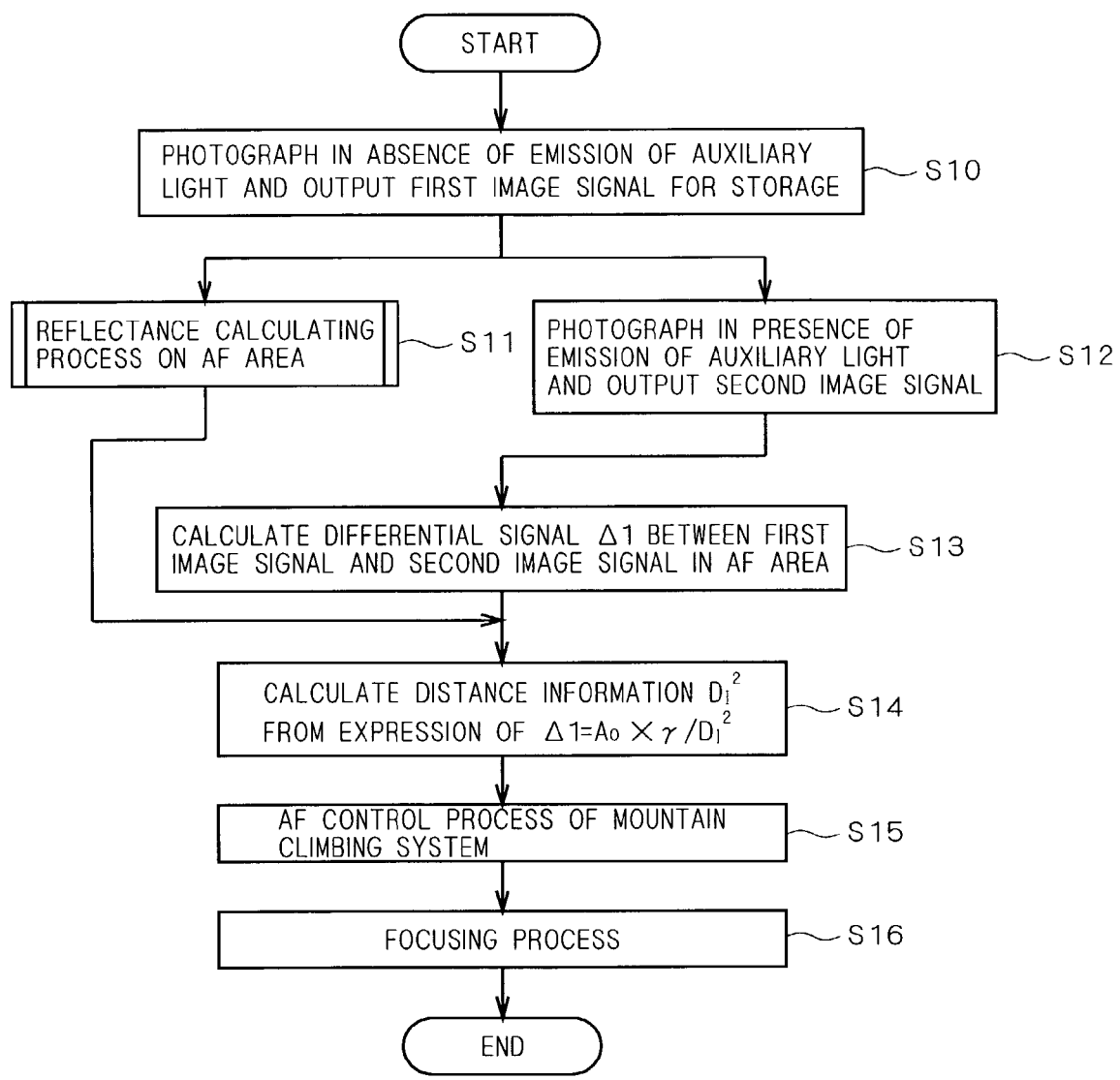
FIG. 6 is a flow chart showing an AF control method according to the second embodiment.

FIG. 5 is a schematic view showing an AF control apparatus according to the second embodiment mounted in the digital still camera 1, and FIG. 6 is a flow chart showing an AF control method thereof. As shown in FIG. 5, the AF control apparatus according to the second embodiment is provided with a buffer memory 39, an AF area extracting section 41, a reflectance calculating section 48, a differential signal calculating section 42, a distance measuring section 50, an AF control section 44, a CPU 40 and a reflectance data base 49 stored in a ROM 10. These sections 41, 42, 48, 50 and 44 are incorporated into the image processing section 17 in the form of hardware or software.

Figure 7:
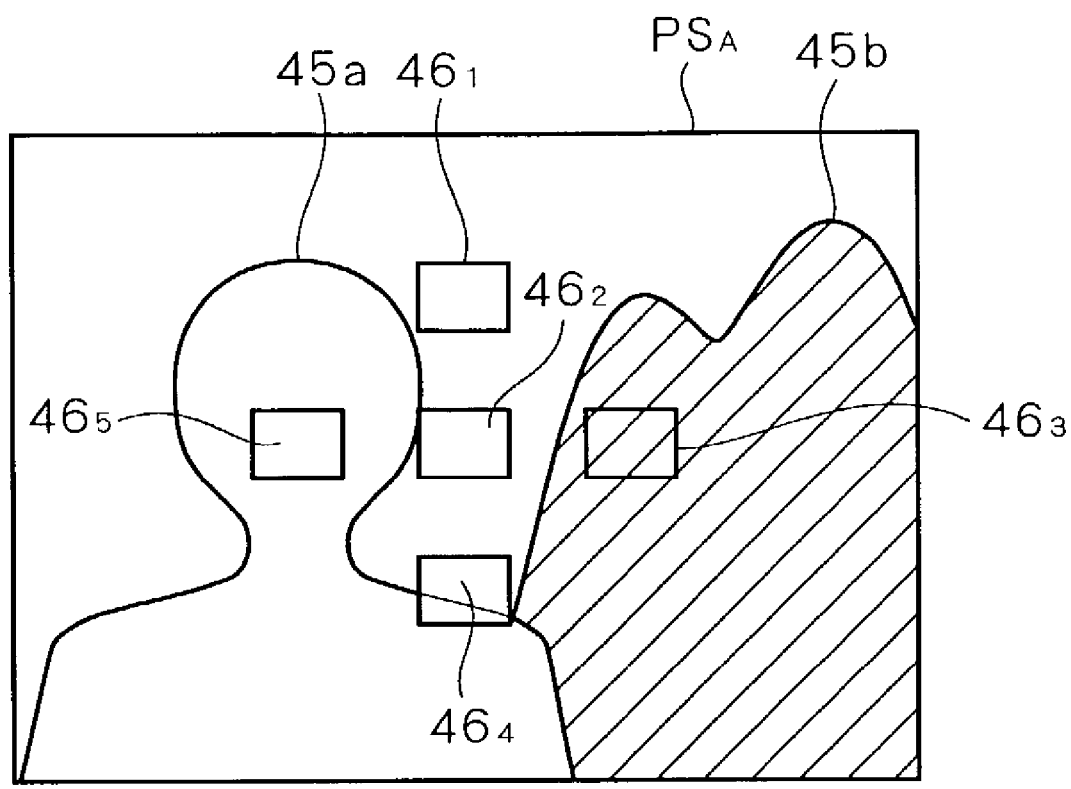
FIG. 7 is a schematic view showing examples of AF areas.

In the following, operations of this AF control apparatus will be explained while referring to the flow chart of FIG. 6. First, at step S10, as is the same with the above-mentioned step S1, the CPU 40 performs a control for photographing a main subject 45 in absence of emission of auxiliary light 30. As a result of this, an image signal $PS_A$ of one frame is inputted to the image processing section 17 from the analogue signal processing section 5. The image signal $PS_A$ is then inputted to the AF area extracting section 41 and the reflectance calculating section 48. After extracting an image signal $PS_a$ of designated AF areas from the image signal $PS_A$, the AF area extracting section 41 outputs the image signal $PS_a$ to the buffer memory 39 for temporary storage. For example, as shown in FIG. 7, in the case where five AF areas $46_1$ to $46_5$ are set with respect to the image signal $PS_A$ of one frame, an image signal $PS_a$ of each AF area $46_1$ to $46_5$ including the subject image 45a and the background image 46b is extracted and outputted to the buffer memory 39.

Figure 8:
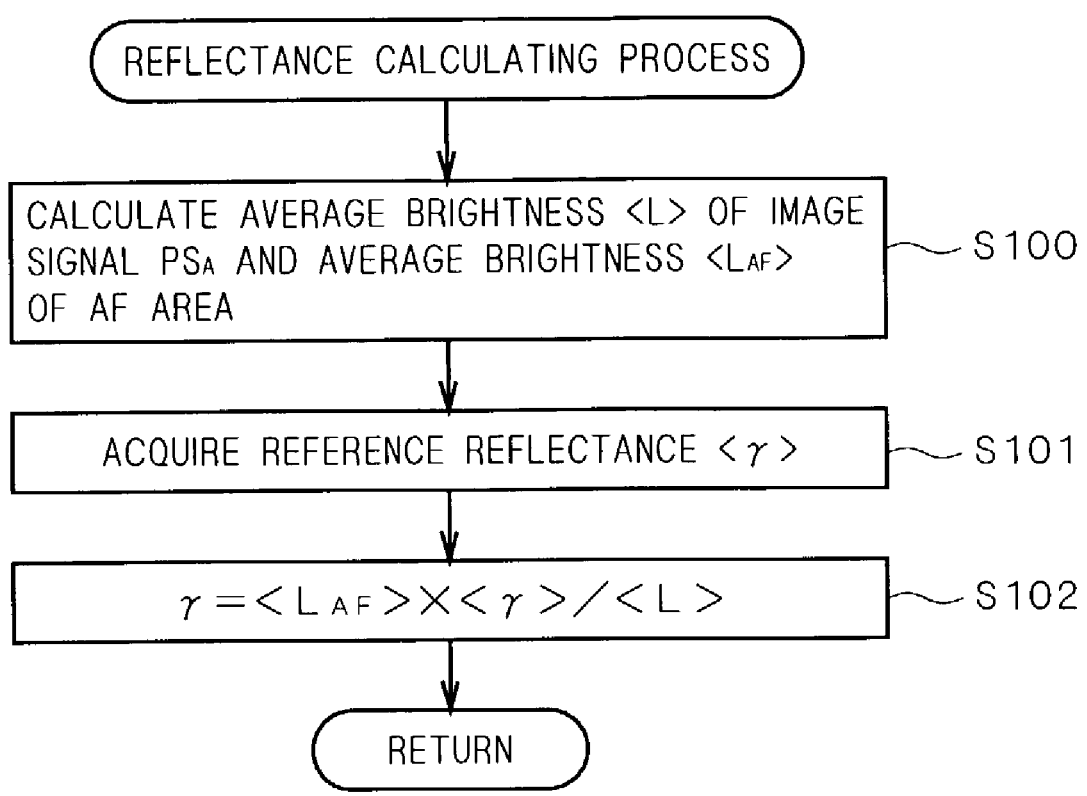
FIG. 8 is a flow chart showing one example of a reflectance calculating process.

At next step S11, the reflectance calculating section 48 calculates a reflectance $\gamma$ of the subject corresponding to each AF area designated at previous step S10 while referring to the reflectance data base 49 in the ROM 10. In the following, one example of a process for calculating the reflectance will be explained with reference to the flow chart of FIG. 8. The reflectance calculating section 48 calculates an average brightness <L>, the average of brightness values of image signal $PS_A$ of one frame, and an average brightness $<L_{AF}>$, the average of brightness values for each AF area (step S100). For example, in the case where the image signal $PS_A$ of one frame shown in FIG. 7 is inputted, the average brightness <L>, the arithmetical mean of brightness values in one frame and the average brightness $<L_{AF}>$ of respective five areas of AF areas $46_1$ to $46_5$ are calculated. In the present case, it is assumed that the AF areas $46_1$ to $46_5$ each has the size of 2×2 pixels to 5×5 pixels, and, 1×1 pixel is also acceptable.

Next, the reflectance calculating section 48 acquires a reference reflectance $<\gamma>$ stored in the ROM 10 (step S101), calculates the reflectance $\gamma$ of each AF area by using the following expression to output the same to the distance measuring section 50 (step S102), and thereafter returns to the process shown in FIG. 6.

$$\gamma = <L_{AF}> \times <\gamma>/<L> \quad (1)$$

As the above reference reflectance $<\gamma>$, a reflectance of having the highest statistical probability of occurrence that has been measured with respect to the subject such as person and scene in advance is utilized, and an optimum reference reflectance is automatically selected in accordance with various exposure mode such as person exposure mode and scene exposure mode.

Next, in parallel with above-mentioned step S11, in step S12, as is the same with above step S2, the CPU 40 performs a control for photographing the main subject 45 in presence of emission of the auxiliary light 30. As a result of this, from the analogue signal processing section 5, an image signal $PS_B$ of the reflected light 32B reflected by the main subject 45 is outputted and inputted to the AF area extracting section 41. The AF area extracting section 41 extracts the image signal $PS_b$ of the AF area of interest from the image signal $PS_B$, and outputs the same to the differential signal calculating section 42. Next, the differential signal calculating section 42 reads out the image signal $PS_a$ stored in the buffer memory 39 in synchronization with inputting of the image signal $PS_b$, calculates in real time a differential signal $\Delta 1$ of the image signal $PS_A$ and $PS_B$ and outputs the differential signal $\Delta 1$ to the distance measuring section 50 (step S13).

At next step S14, the distance measuring section 50 calculates distance information $D_1$ to the subject by utilizing the differential signal $\Delta 1$, the reflectance $\gamma$ calculated at the reflectance calculating section 48 and the fact that the intensity of the above auxiliary light attenuates in accordance with the inverse-square law. "Inverse-square law" used in the description means that illuminance on the subject surface by a point light source is in inverse proportion to the square of the distance $D_1$. From the above, the following expression (2) is approximately established.

$$\Delta 1 = A_0 \times \gamma / D_1^2 \quad (2)$$

In the above expression (2), $A_0$ is a proportionality constant. And modification of the above expression (2) provides the following expression (3).

$$D_1 = (A_0 \times \gamma / \Delta 1)^{1/2} \quad (3)$$

Using the expression (3), the distance measuring section 50 can uniquely calculates the distance information $D_1$ and output the same to the AF control section 44.

At next step S15, as is the same with the above step S6, the AF control section 44 executes AF control of the above-described mountain climbing system with the user of the distance information $D_1$ input from the distance measuring section 50. Then, as the lens position of the optical mechanism 2 reaches near the focusing position at step S16, the CPU 40 detects that condition and makes the LCD 11 serving as a finder display a focus mark.

In accordance with the AF control apparatus as described above, it is possible to estimate the reflectance of the subject based on the image signal $PS_A$ in absence of the auxiliary light 30 by referring to the reflectance data base 49, as well as it is possible to uniquely calculate the distance information $D_1$ by using the above expression (2) based on the differential signal $\Delta 1$. Therefore, rapid AF control is enabled. Furthermore, since the AF control of the mountain climbing system is executed using the distance information $D_1$, it is possible to significantly reduce the focusing time with respect to the main subject.

Third Embodiment

Next, in the third embodiment, another example of the process of calculating reflectance of AF area (step S11) will be explained. In the second embodiment as described above, the calculated reflectance of the shade part of the subject is smaller than that of the part where a shade does not occur, which deteriorates the accuracy of distance information $D_1$. The third embodiment takes influence of such a shade part into account and provides correcting means of reflectance $\gamma$.

As described in the second embodiment, the reflectance calculating section 48 calculates a reflectance $\gamma$ without taking shade part included in the image signal $PS_A$ into account. In the third embodiment, it is to be assumed that an AF area is formed of matrix arrangement of a plurality of small blocks (image areas) of about 3×3 pixels to 5×5 pixels. The reflectance calculating section 48 acquires from the reflectance data base 49, a probability of occurrence of the event when each small block in that AF area includes a shade part z=SHD (Lc, Ls), corrects the reflectance $\gamma$ using the probability in accordance with the following expression (4), and calculates a reflectance $\gamma_1$ after correction of each small block.

$$\gamma_1 = \gamma \times F(1-z) \quad (4)$$

In the above expression (4), F(1−z) is a decreasing function of variable 1−z (probability of occurrence of the event when the current small block does not include a shade part). That is, the higher the value of the variable 1−z, the smaller the value of F(1−z) becomes. As an approximate form of the function F(1−z), F(1−z)=$A_0$/(1−z) ($A_0$: constant) can be exemplified.

Figure 9:
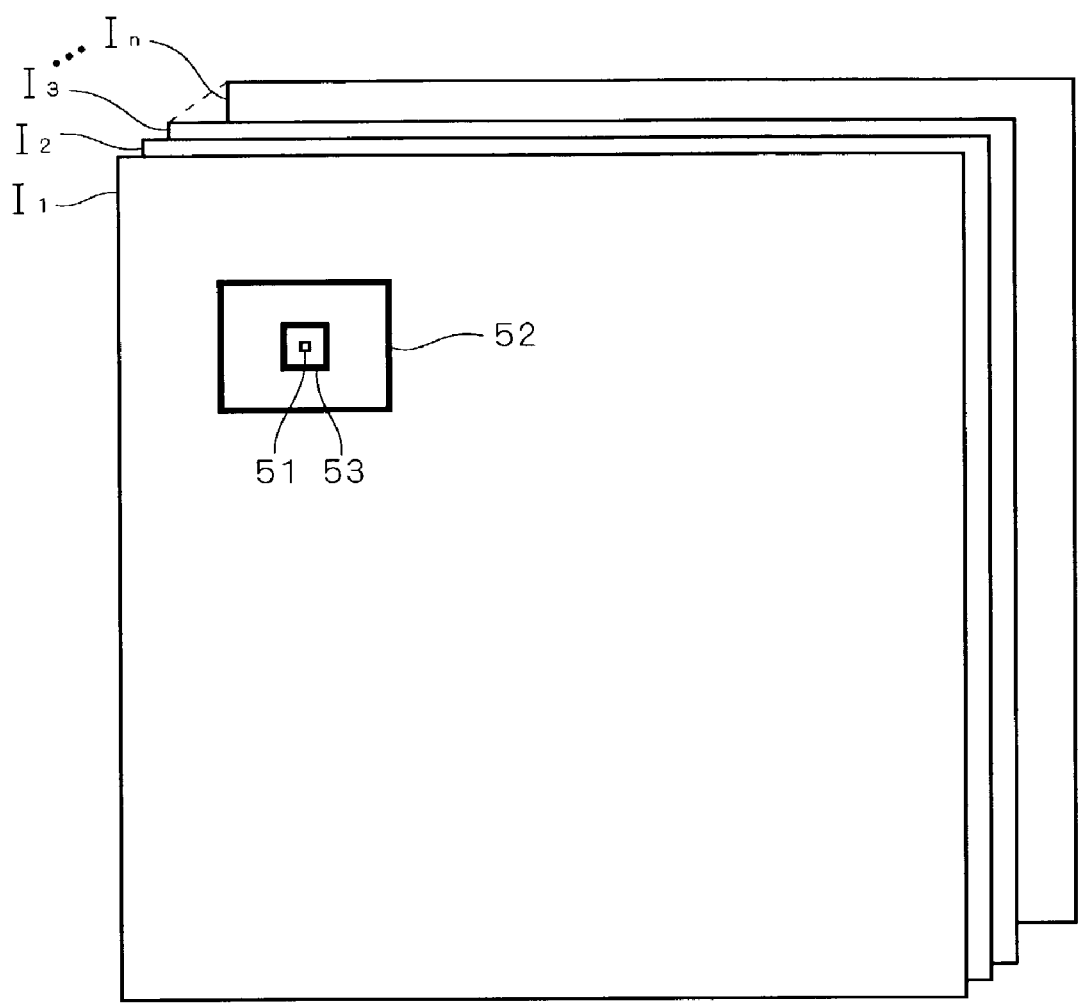
FIG. 9 is a schematic view for explaining a data base generating process in the third embodiment.

Next, an algorithm for generating the above-mentioned correction data z=SHD (Lc, Ls) will be explained with reference to FIG. 9. First, a plurality of still images (frames) $I_1, I_2, \ldots, I_n$ which are used as a basis for generating a data base are prepared. As shown in FIG. 9, now focusing on a pixel 51 in the frame $I_1$, the small block is composed of a center part of about 1×1 pixel to 2×2 pixels including the pixel of interest 51 and a peripheral part 52 of the periphery excluding the center part 53. Next, an average brightness Lc of the center part 53 and an average brightness Ls of the peripheral part 52 are calculated. Then, whether the small block contains a shade part or not is determined by a person. When it is determined that the small block contains a shade part, "1" is added to the count value N (Lc, Ls) of two-dimensional arrangement. After executing the above process while taking note of every pixel in the frames $I_1, I_2, \ldots, I_n$, when the total number of the pixels of interest is represented by Np, the correction data SHD (Lc, Ls) is calculated by the following expression (5).

$$SHD(Lc, Ls)=N(Lc, Ls)/Np \qquad (5)$$

The correction data SHD (Lc, Ls) (=z; $0 \leq z \leq 1$) thus calculated is stored in the reflectance data base 49. Accordingly, a data base of correction data wherein an average brightness Lc of the center part 53 and an average brightness Ls of the peripheral part 54 of a pixel of interest are two variables has been constructed. In general, a shade part in a frame causes a problem when it appears in a comparative wide range, and therefore by taking brightness information of not only the center part 53 but also of the peripheral portion 52 into account, it is possible to include information of the shade part into the correction data SHD (Lc, Ls) with accuracy.

In the AF control process according to the third embodiment, the reflectance calculating section 48 as described above calculates the average brightness Lc of the center part 53 of each block and the average brightness Ls of the peripheral part 52 thereof in the AF area of the image signal $PS_A$. Next, the reflectance calculating section 48 acquires from the reflectance data base 49 correction data SHD (LC, Ls) wherein the calculated average brightnesses Lc and Ls are two variables, calculates a corrected reflectance $\gamma_1$ of each small block from the above expression (4), and outputs the same to the distance measuring section 50. It is to be noted that in the case where the approximate form of $A_0/(1-z)$ is adopted as the function F (1-z), if the probability of occurrence z of shad part is near "1", the value of F (1-z) becomes extremely large, so that error will be large. For preventing this, when the probability of occurrence z exceeds a set value (¾, for example), the value of F (1-z) can be replaced by a predetermined value (zero, for example).

In the distance measuring section 50, a block of the highest contrast is selected from the respective small blocks, and the distance information $D_1$ is calculated by using the reflectance $\gamma_1$ of that block. In this manner, even if a shade part is included in the AF area of the image signal $PS_A$, a reflectance $\gamma_1$ wherein the influence of the shade part is corrected can be calculated, which makes it possible to improve the accuracy of the distance information $D_1$.

In the third embodiment, an example wherein the AF area is composed of a plurality of small blocks is shown, however, the size of the AF area and the size of the small block may coincide with each other.

Furthermore, the above-mentioned correction data SHD (Lc, Ls) is a two-variable function, however, since corners of image of the image data $I_1, I_2, \ldots, I_n$ also relate to the range of the shade part, it is preferred to configure the correction data SHD (Lc, Ls, $f_0$) so as to include the focal length $f_0$ of the lens at the time of the exposure of the image data $I_1, I_2, \ldots, I_n$ for the purpose of improving the correction accuracy of the reflectance γ. As a result of this, it is possible to improve the accuracy of the distance information $D_1$.

Fourth Embodiment

Figure 10:
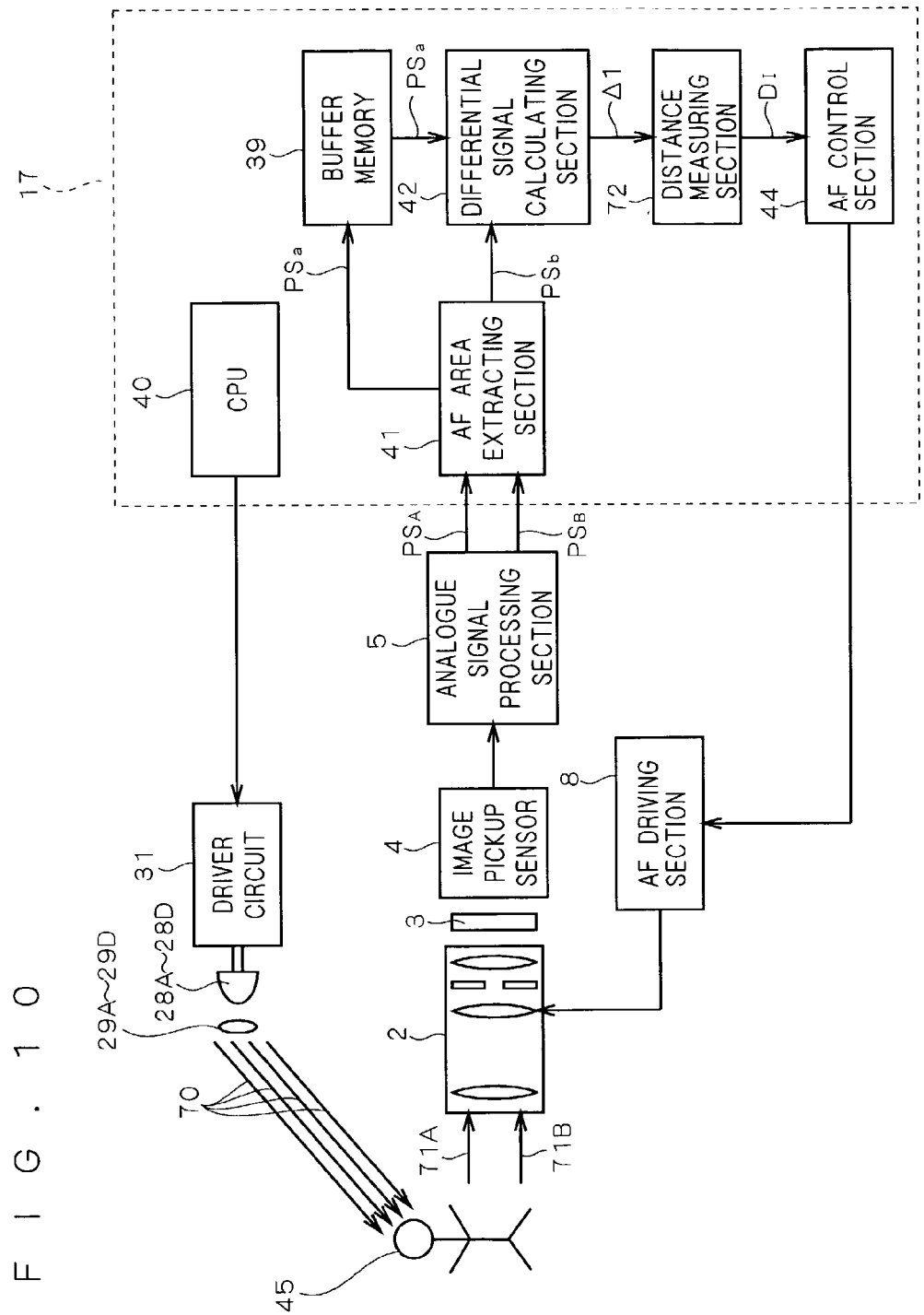
FIG. 10 is a schematic configuration view showing an AF control apparatus according to the fourth embodiment of the present invention.
Figure 11:
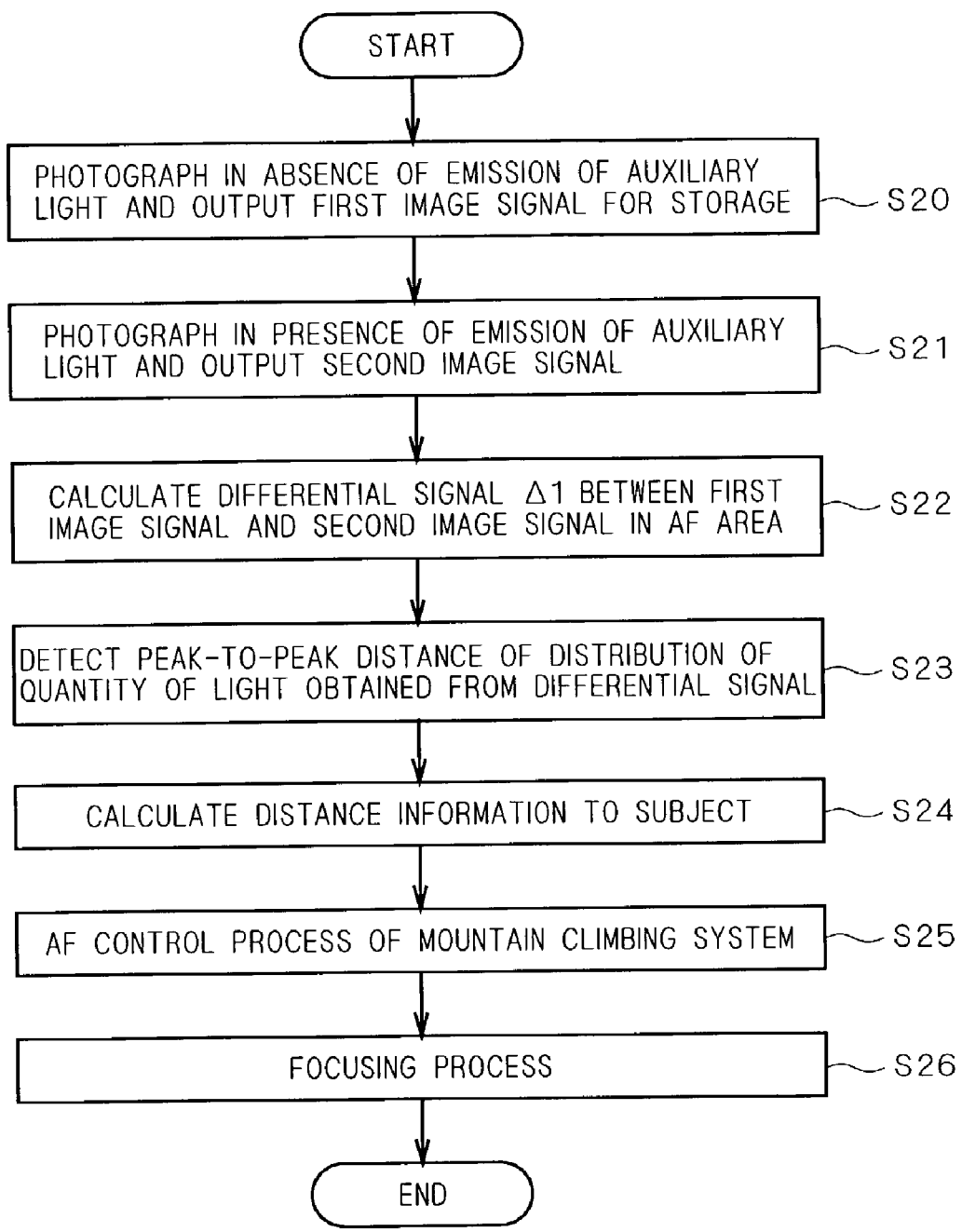
FIG. 11 is a flow chart showing an AF control method according to the fourth embodiment.

Next, the fourth embodiment of the present invention will be explained. FIG. 10 is a schematic configuration view showing an AF control apparatus according to the fourth embodiment mounted in the digital still camera 1 shown in FIG. 1, and FIG. 11 is a flow chart showing an AF control method thereof. As shown in FIG. 10, the AF control apparatus according to the fourth embodiment is provided with a buffer memory 39, an AF area extracting section 41, a differential signal calculating section 42, a distance measuring section 72, an AF control section 44 and a CPU 40.

In the fourth embodiment, as the illumination means for emitting auxiliary light 70 to a main subject 45, the one that is able to emit light with directivity along the optical axis of the optical mechanism 2 is adopted. Such illumination means consists of a plurality of LED light sources 28A, 28B, 28C, 28D which are supplied with driving pluses from a driver circuit 31, and lenses 29A, 29B, 29C, 29D for focusing the light emitted by these LED (light emitting diode) light sources 28A to 28D. The CPU 40 controls the timing of light emission and the quantity of light emission of the LED light sources 28A to 28D with respect to the driver circuit 31. In FIG. 10, though the auxiliary light 70 does not seem to advance parallel with the optical axis of the optical mechanism 2, the auxiliary light 70 actually advances substantially parallel with the optical axis.

Figure 12:
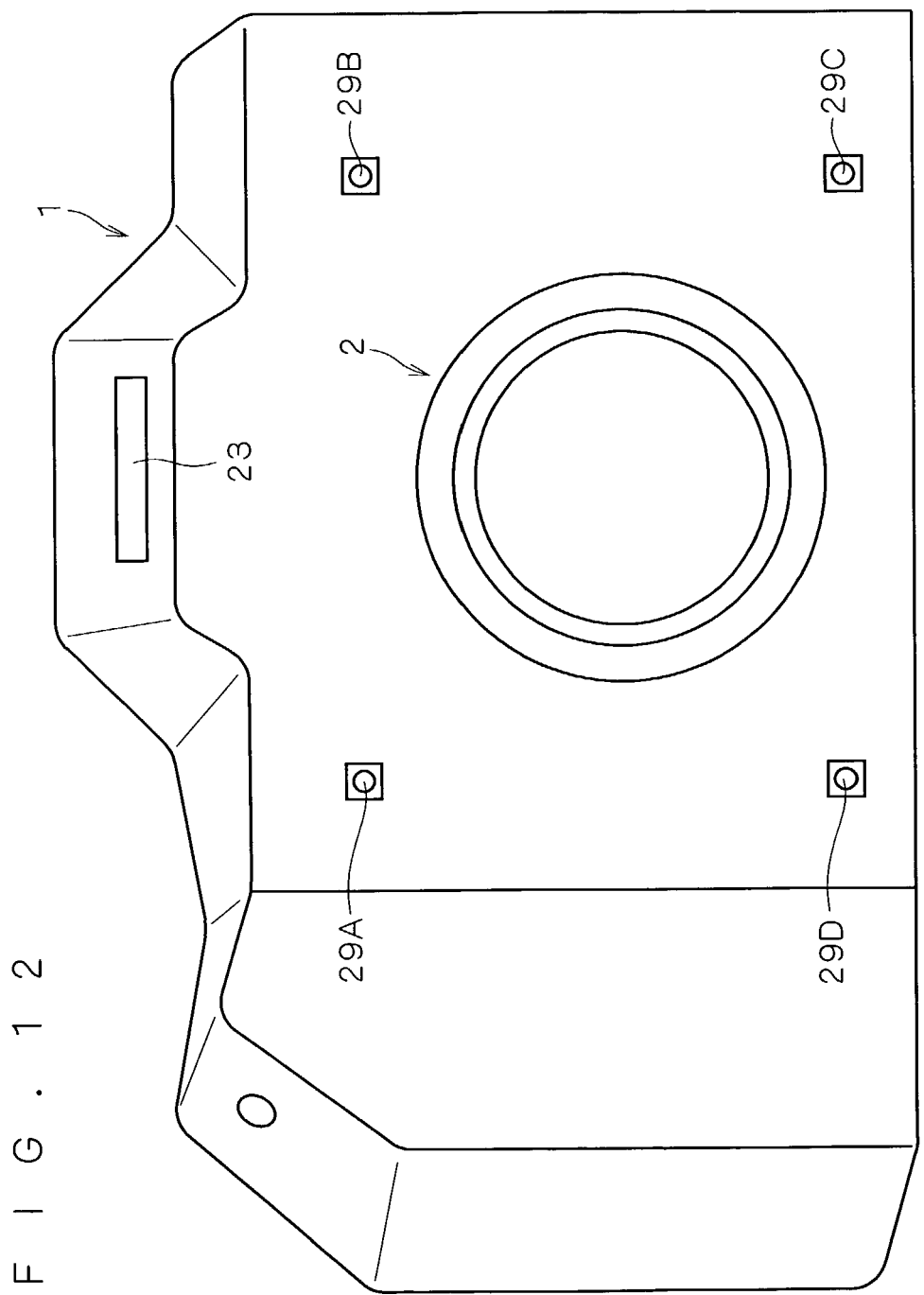
FIG. 12 is a schematic view showing an example wherein a digital still camera according to the fourth embodiment is equipped with an LED light source.

FIG. 12 is a schematic view showing an example wherein the above-mentioned illumination means is mounted in the digital still camera 1. In FIG. 12, the reference numeral 23 represents a stroboscope which emits flash light, the reference numeral 2 represents an optical mechanism, the reference numerals 29A to 29D represent focusing lenses for focusing the light emitted from the LED light sources 28A to 28D (not shown). In the present embodiment, the LED light sources 28A to 28D are used, however, laser diodes of low output level may be used in place of these.

Next, operations of the AF control apparatus having the above configuration will be explained with reference to the flow cart of FIG. 11. First, at step S20, the CPU 40 performs a control for photographing the main subject 45 in absence of the auxiliary light 70. That is, reflected light 71A from the main subject 45 passes through the optical mechanism 2 and the optical LPF 3, undergoes the CDS process and AGC process at the analogue signal processing section 5, then undergoes A/D conversion to be input to the image processing section 17 as an image signal $PS_A$ of one frame. The AF area extracting section 41 extracts an image signal $PS_a$ in given AF areas from the image signal $PS_A$, and outputs the image signal $PS_a$ to the buffer memory 39 for temporal storage.

Figure 13:
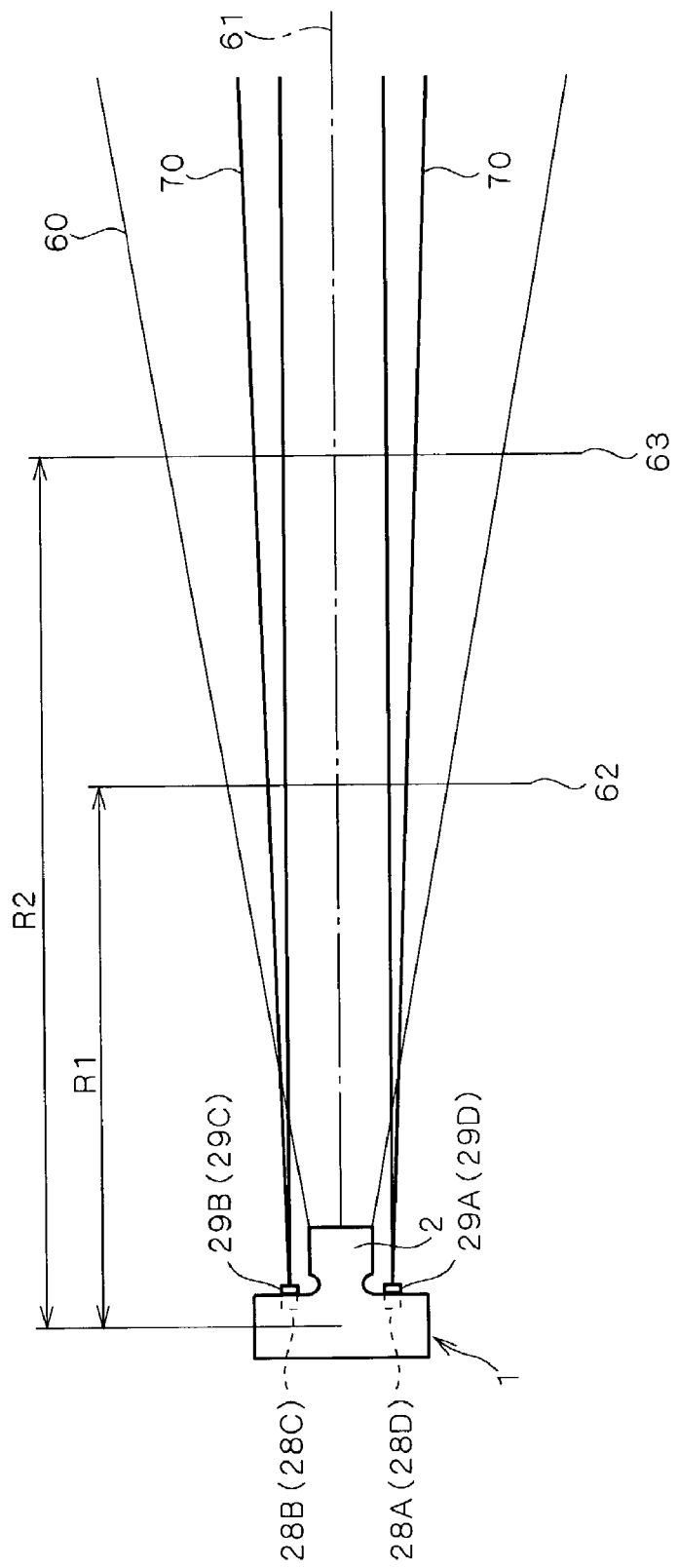
FIG. 13 is a view of auxiliary light emitted to a main subject.

At next step S21, the CPU 40 performs a control for photographing the main subject 45 in presence of the auxiliary light 70. That is, the CPU 40 issues trigger signals to the driver circuit 31 for making the LED light sources 28A to 28D emit, and the auxiliary light 70 is emitted to the main subject 45 from the LED light sources 28A to 28D supplied with driving pulses from the driver circuit 31. FIG. 13 is a view of beams of two auxiliary light 70, 70 seen from the perpendicular direction of the optical axis 61 of the optical mechanism 2 (seen from above the camera 1). In FIG. 13, the reference numerals 28A to 28D represent LED light sources, the reference numerals 29A to 29D represent focusing lens, the reference numeral 60 represents an image pickup area of the lens (optical mechanism) 2, and the reference numeral 61 represents the optical axis of the lens 2. The LED light sources 28A to 28D are spatially arranged on the plane perpendicular to the optical axis 61.

Figure 14:
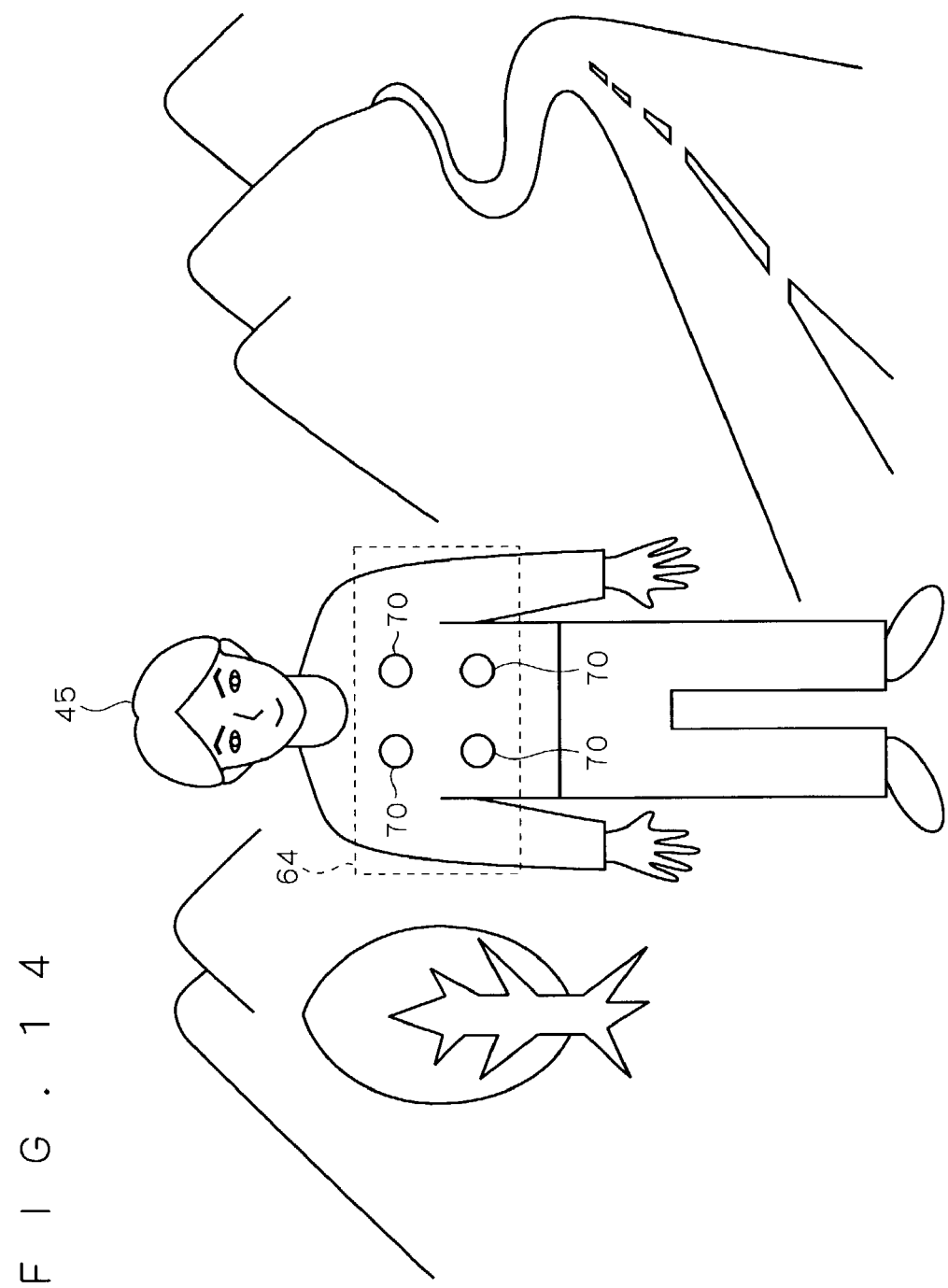
FIG. 14 is a schematic view showing an example of spots of auxiliary light when the main subject is located at a short distance.

FIG. 14 is a schematic view showing an example of irradiation spots 70, 70, 70, 70 of four beams of auxiliary light 70 emitted to the main subject 45 in the AF area 64. Reflected light 71B from the main subject 45 that is illuminated with such auxiliary light 70 enters the optical mechanism 2, and passes through the optical LPF 3 to be detected at the image pickup sensor 4. Then, an image signal $PS_B$ is outputted from the analogue signal processing section 5. The AF area extracting section 41 extracts an image signal $PS_b$ of the AF area from the image signal $PS_B$, and then outputs the same to the differential signal calculating section 42.

Figure 15:
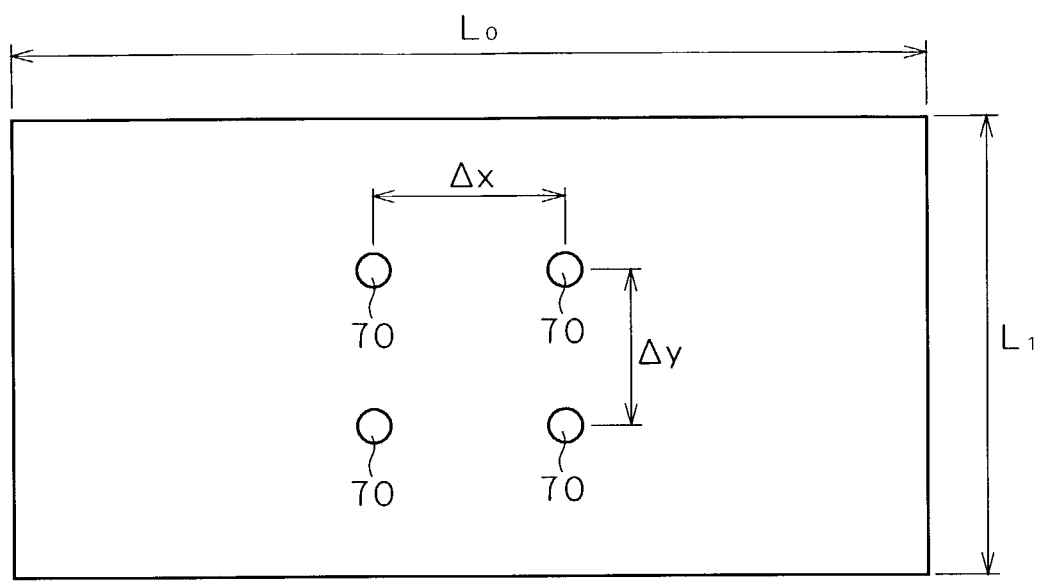
FIG. 15 is a schematic view showing one frame of a differential signal including spots of auxiliary light.
Figure 16:
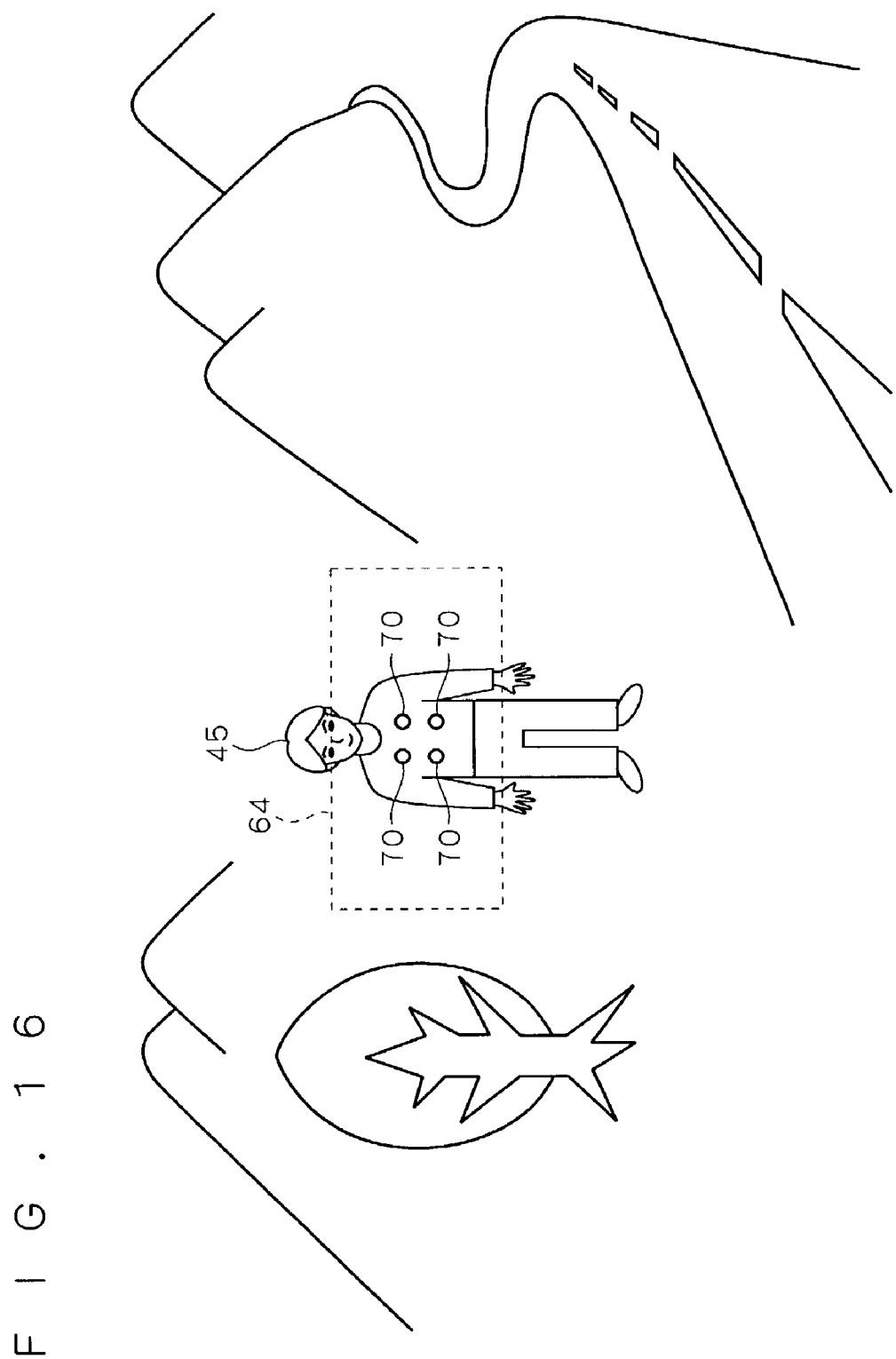
FIG. 16 is a schematic view showing an example of spots of auxiliary light when the main subject is located at a long distance.
Figure 17:
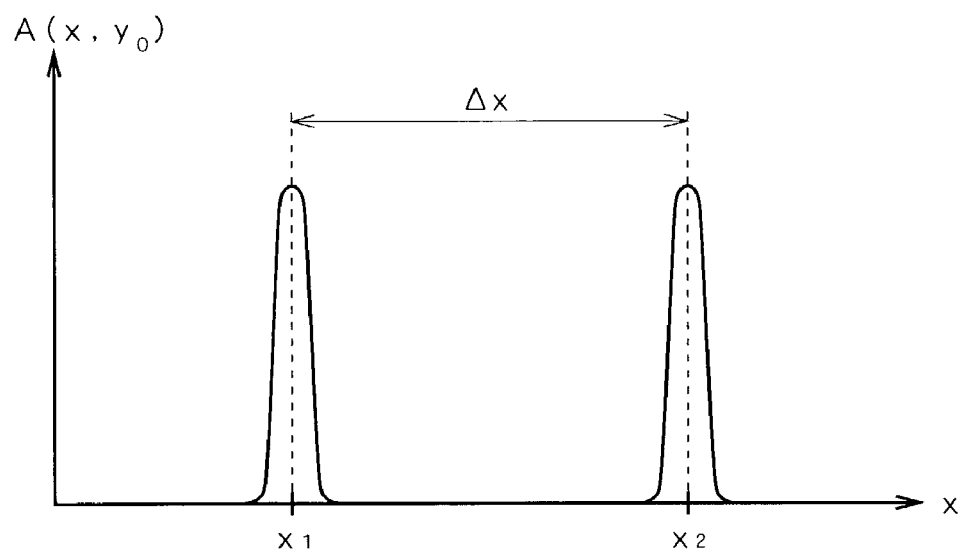
FIG. 17 is a view showing an example of distribution of quantity of light when the main subject is located at a short distance.
Figure 18:
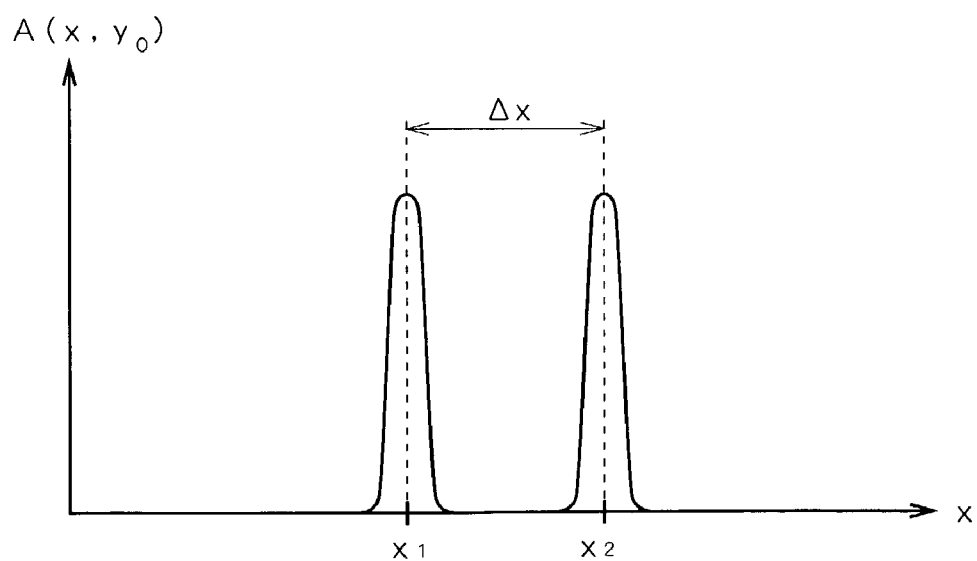
FIG. 18 is a view showing an example of distribution of quantity of light when the main subject is located at a long distance.

At next step S22, the differential signal calculating section 42 reads the image signal $PS_a$ stored in the buffer memory 39 in synchronization with input of the image signal $PS_a$, and calculates in real time a differential signal $\Delta 1$ of the image signal $PS_a$ and the image signal $PS_b$, and outputs the differential signal $\Delta 1$ to the distance measuring section 72. Since the image signals $PS_A$ in absence of emission of the auxiliary light 70 and $PS_B$ in presence of emission thereof are signals that are obtained by continuous exposure in a short time, the differential signal $\Delta 1$ includes only the distribution of quantity of light (brightness distribution) of the reflected light of the auxiliary light 70 emitted to the main subject 45. FIG. 15 is a schematic view showing image data of the differential signal $\Delta 1$. In FIG. 15, $L_0$ represents a horizontal distance of a current image pickup range (horizontal pixel number), $L_1$ represents a vertical distance of a current image pickup range (horizontal pixel number), $\Delta x$ represents a peak-to-peak distance (pixel number) in the horizontal direction between the illumination spots 70 and 70, and $\Delta y$ represents a peak-to-peak distance (pixel number) in the vertical direction between the illumination spots 70 and 70. As shown in FIG. 13, when the auxiliary light beams 70 to 70 are emitted to an objective surface (a surface representing the position where the subject is positioned) 62 which is apart from the digital still camera 1 by a distance R1 along the direction of the optical axis, the illumination spots 70 to 70 are formed in the AF area 64 as shown in FIG. 14, whereas when the auxiliary light beams 70 to 70 are emitted to an objective surface 63 which is far apart from the objective surface 62 by a distance R2, the illumination spots 70 to 70 are formed in the AF area in such forms as shown in FIG. 16. As shown in FIGS. 13 and 14, the farther the subject 45 is positioned, the smaller the diameters of the illumination spots 70 to 70 occupying the AF area 64 become. In other words, the distribution of quantity of light (brightness distribution) in the horizontal direction of the auxiliary light beams 70, 70 emitted on the objective surface 62 will be a distribution A ($x, y_0$) as shown in FIG. 17, and the distribution in the horizontal direction of the auxiliary light beams 70, 70 emitted on the objective surface 63 which is farther than the objective surface 62 will be a distribution A ($x, y_0$) as shown in FIG. 18.

After step S22 as described above, the distance measuring section 72 detects a peak position of the distribution of quantity of light (brightness distribution) appearing in the differential signal $\Delta 1$ by using the binarization or multi-valuing process, followed by calculation of the peak-to-peak distance $\Delta x$ or $\Delta y$ of the distribution of quantity of light (step S23), and then calculates distance information $D_1$ to the subject using ratio ($\Delta x/L_0$ or $\Delta y/L_1$) of the peak-to-peak distance $\Delta x, \Delta y$ with respect to the horizontal distance $L_0, L_1$ (step S24). It is known that a distance between the digital still camera 1 and the main subject 45 is in inverse proportion to the ratio $\Delta x/L_0$ or $\Delta y/L_1$, as well as in inverse proportion to tan ($\phi_0/2$) ($\phi_0$: horizontal angle of view) or tan ($\phi_1/2$) ($\phi_1$: vertical angle of view). In connection with this, the horizontal angle of view $\phi_0$ and the vertical angle of view $\phi_1$ depend on the property of the optical mechanism 2. The distance measuring section 72 calculates the distance information $D_1$ utilizing the above fact for output to the AF control section 44.

At next step S25, as is the same with the above-described step S6, the AF control section 44 executes AF control of the mountain climbing system with the use of the distance information $D_1$ input from the distance measuring section 43, and makes the lens position of the optical mechanism 2 coincide with the focusing position.

In the manner as described above, according to the AF control apparatus of the fourth embodiment, it becomes possible to achieve rapid AF control since the distance information $D_1$ to the subject can be calculated uniquely with high accuracy. Furthermore, by using the distance information $D_1$ for the AF control of the mountain climbing system, it becomes possible to significantly reduce the focusing time.

It is to be understood that in place of arranging the focusing lenses 29A to 29D and the LED light sources axisymmetrically with respect to the optical axis of the optical mechanism 2 as shown in FIG. 12, the focusing lenses 29A to 29D and the LED light sources may be arranged in deviated positions with respect to the optical axis of the optical mechanism 2 as shown in FIG. 19.

Fifth Embodiment

Next, the fifth embodiment of the present invention will be explained. In the fourth embodiment described above, the peak position of the distribution of quantity of light A (x, y) obtained from in the differential signal $\Delta 1$ was detected by the binarization or multi-valuing process, and then the peak-to-peak distance thereof $\Delta x, \Delta y$ was calculated. The fifth embodiment provides another calculating means for calculating the peak-to-peak distance $\Delta x, \Delta y$.

That is, in the above distance measuring section 72, a spatial frequency spectrum $F(k_x, k_y)$ is calculated by subjecting the distribution of quantity of light A (x, y) of the above differential signal $\Delta 1$ to the FFT (fast Fourier transform) of x direction and y direction according to the following expression (6).

$$F(k_x, k_y) = \int \int A(x, y) \exp(-i2\pi(k_x x + k_y y)) dx dy \quad (6)$$

$k_x$: spatial frequency in x direction
$k_y$: spatial frequency in y direction $$i = \sqrt{-1}$$

Since the dimension of the distance x, y is "pixel", the dimension of the spatial frequency $k_x, k_y$ is "1/pixel". Also, as shown in FIGS. 17 and 18, only execution of the integration in the x direction in the above expression (6) is required for calculating a peak-to-peak distance of the x direction.

Then, a peak position of an amplitude spectrum $|F(k_x, k_y)|$ which is the absolute value of $F(k_x, k_y)$ is calculated. In this amplitude spectrum, a peak appear in the spatial frequency components $k_{xp}, k_{yp}$ respectively corresponding to the peak-to-peak distance $\Delta x, \Delta y$ in the x direction and the y direction shown in FIG. 15. By detecting this peak and obtaining a spatial frequency component kxp, kyp corresponding to each peak, the peak-to-peak distance Δx, Δy of the distribution of quantity of light A (x, y) is calculated according to the following expressions (7A), (7B).

$$\Delta x = 1/k_{xp} \quad (1)$$

$$\Delta y = 1/k_{yp} \quad (2)$$

After calculating this peak-to-peak distance Δx, Δy, the processes of steps S24 to S26 in the above-described forth embodiment are executed. In the manner as described above, according to the fifth embodiment, since the peak-to-peak distances Δx, Δy can be calculated accurately using the FFT, the accuracy of the distance information $D_1$ is improved. Also by adopting an orthogonal transform such as DCT (discrete cosine transform), and calculating the spatial frequency spectrum thereof, it is possible to obtain the similar result and effect as described above.

Modified Examples from the First to the Fifth Embodiments

The distance measuring sections 43, 50, 72 in the first to the fifth embodiments as described above may be provided with a mode (close distance priority mode) wherein a low brightness region having a brightness value of less than a predetermined threshold is removed from the differential signal Δ1 in the AF area, at the time of calculating the distance information $D_1$. Generally, there is a tendency that brightness of a differential signal of the surface of a subject located at a short distance is relatively high, and that of the surface of a subject located at a long distance is relatively low. Therefore, in the case where there are both of the subjects at a short distance and at a long distance in on AF area, by removing the above-mentioned low brightness region, it is possible to precedently focus on the subject at a very-close distance, so that an the above-described out-of-focus background can be prevented.

On the other hand, there is also a case that focusing on a subject at a short distance is desired to be prevented at the time of photographing scene or the like. In such a case, it is preferred that the distance measuring sections 43, 50, 72 are provided with a mode for removing a high brightness region having a brightness value of not less than a predetermined mode from a differential signal Δ1 in the AF area (long distance priority mode) in the case of calculating the distance information $D_1$.

Furthermore, in calculating the differential signal Δ1, since the magnitude of the differential signal Δ1 of a shade part of the subject is larger than that of the part where a shade does not occur, this causes a decrease in AF accuracy. For improving this problem, it is preferred that each distance measuring section 43, 50, 72 is provided with a mode for calculating distance information $D_1$ while removing a high brightness region having a high brightness of not less than a predetermined threshold from the differential signal Δ1 in the AF area (low brightness priority mode). Since only a high brightness region corresponding to the shade part can be removed from the differential signal Δ1 depending on the setting value of threshold, it is possible to calculate the distance information $D_1$ more accurately and improve the AF accuracy.

Furthermore, in another measure for improving deterioration of the AF accuracy due to the shade part, the AF control apparatus according to each embodiment as described above is provided with means for detecting a low brightness region having a brightness region of not more than a predetermined threshold in the image signal $PS_A$ outputted from the analogue signal processing section 5 (not shown), and may have a mode wherein the above-mentioned differential signal calculating section 42 calculates a differential signal Δ1 as for the area where the above low brightness region is removed from the AF area, and the above-mentioned each distance measuring section 43, 50, 72 calculates the distance information $D_1$ by using the differential signal Δ1 thus calculated (shade part removing mode). Since the low brightness region corresponding to the shade part can be removed from the image signal $PS_A$, it is possible to calculate the distance information $D_1$ more accurately and improve the AF accuracy.

These "close distance priority mode", "long distance priority mode", "low brightness priority mode" and "shade part removing mode" may be manually changeable, however, it is also possible that the mode is set at "very-close distance mode" in normal use, and when the following condition is satisfied, the mode is automatically changed to other mode. That is, whether or not a maximum value of the brightness value (maximum brightness value) of the differential signal Δ1 in the AF area is not less than a predetermined threshold, and in the condition that the maximum is not less than the threshold, each distance measuring section 43, 50, 72 is controlled so that the mode is changed to the low brightness priority mode.

Furthermore, it is also possible that the mode is set at "close distance priority mode" in normal use, and whether or not a maximum value of the brightness value (maximum brightness value) of the differential signal Δ1 in the AF area is less than a predetermined threshold, and in the condition that the maximum is less than the threshold, the above-described analogue signal processing section 5 or each distance measuring section 43, 50, 72 is controlled so that the mode is changed to the long distance priority mode.

Furthermore, as shown in FIGS. 4 and 7, when a plurality of AF areas $46_1$ to $46_5$ are set for the image signal $PS_A$, the center AF area $46_2$ is often selected in a default setting. However, as shown in FIG. 7, in the case where the AF area $46_2$ corresponds to the infinite background, an out-of-focus background will occur. For addressing this situation, it is preferred that each of the distance measuring sections 43, 50, 72 of the above-mentioned first to third embodiments are provided with a mode for calculating differences in high frequency component between the center AF area $46_2$ and the peripheral AF areas $46_1$, $46_3$ to $46_5$ and precedently selecting an AF area having high brightness component of the above differential signal Δ1 when the calculated differences lie within a predetermined range (close distance priority mode) when calculating the distance information $D_1$. As a result of this, even when the AF area $46_2$ of the center part corresponds to the background as shown in FIG. 7, there is a high possibility that the AF area $46_5$ adjacent on its left corresponding to the main subject 45a at a very-close distance is automatically selected, and hence an out-of-focus background is prevented.

Furthermore, in the case where the brightness of the differential signal Δ1 of the AF area $46_2$ of the center part is low, there is a high possibility that the subject corresponding to the AF area $46_2$ is located at a long distance. For this reason, it is preferred that each of the distance measuring sections 43, 50, 72 of the first to third embodiments is provided with a mode wherein when the maximum value of the brightness value of the differential signal Δ1 in the AF area $46_2$ is not more than the predetermined threshold, the area is automatically changed to the adjacent AF area $46_5$, for example.

While the invention has been shown and described in detail, the foregoing description is in all aspects illustrative and not restrictive. It is therefore understood that numerous other modifications and variations can be devised without departing from the scope of the invention.

What is claimed is:

1. An AF control apparatus for executing AF (automatic focusing) control of an optical system mounted in a camera, comprising:
   an image pickup sensor for detecting an incident light from a subject;
   a light source for emitting an auxiliary light to said subject;
   a differential signal calculating section for outputting a differential signal between a first image signal which is obtained by image pickup by said image pickup sensor when said light source does not emit said auxiliary light, and a second image signal which is obtained by image pickup by said image pickup sensor when said light source emits said auxiliary light;
   a distance measuring section for calculating distance information to said subject based on said differential signal;
   an AF control section for controlling an AF operation of said optical system based on said distance information; and
   a reflectance calculating section for calculating a reflectance of said subject based on said first image signal, wherein
   said distance measuring section calculates said distance information using said reflectance calculated at said reflectance calculating section under the condition that intensity of said auxiliary light attenuates in accordance with the inverse-square law.

2. An AF control apparatus for executing AF (automatic focusing) control of an optical system mounted in a camera, comprising:
   an image pickup sensor for detecting an incident light from a subject;
   a light source for emitting an auxiliary light to said subject;
   a differential signal calculating section for outputting a differential signal between a first image signal which is obtained by image pickup by said image pickup sensor when said light source does not emit said auxiliary light, and a second image signal which is obtained by image pickup by said image pickup sensor when said light source emits said auxiliary light;
   a distance measuring section for calculating distance information to said subject based on said differential signal;
   an AF control section for controlling an AF operation of said optical system based on said distance information; and
   a reflectance calculating section for calculating a reflectance of said subject based on said first image signal, wherein
   said distance measuring section calculates said distance information using said reflectance calculated at said reflectance calculating section under the condition that intensity of said auxiliary light attenuates in accordance with the inverse-square law,
   wherein said reflectance calculating section includes:
      means for calculating an average brightness of one frame of said first image signal and an average brightness of a given AF area set for said one frame; and
      means for calculating said reflectance corresponding to said average brightness of said AF area using a predetermined reference reflectance in corresponding with said average brightness of one frame.

3. An AF control apparatus for executing AF (automatic focusing) control of an optical system mounted in a camera, comprising:
   an image pickup sensor for detecting an incident light from a subject;
   a light source for emitting an auxiliary light to said subject;
   a differential signal calculating section for outputting a differential signal between a first image signal which is obtained by image pickup by said image pickup sensor when said light source does not emit said auxiliary light, and a second image signal which is obtained by image pickup by said image pickup sensor when said light source emits said auxiliary light;
   a distance measuring section for calculating distance information to said subject based on said differential signal;
   an AF control section for controlling an AF operation of said optical system based on said distance information;
   a reflectance calculating section for calculating a reflectance of said subject based on said first image signal, wherein
   said distance measuring section calculates said distance information using said reflectance calculated at said reflectance calculating section under the condition that intensity of said auxiliary light attenuates in accordance with the inverse-square law; and
   a data base for storing a probability of occurrence of an event that an image area having a given image size includes a shade part, wherein
   said probability of occurrence has two variables: average brightness of a center part in said image area; and average brightness of a peripheral part, and
   said reflectance calculating section including means which calculates an average brightness of said center part and an average brightness of said peripheral part of said image area included in said AF area, and means which acquires said probability of occurrence having said average brightnesses as said two variables from said data base and corrects said reflectance based on said probability of occurrence.

4. An AF control method for executing AF (automatic focusing) control of an optical system mounted in a camera, comprising the steps of:
   (a) detecting an incident light from a subject by an image pickup sensor without emitting an auxiliary light to said subject, thereby obtaining a first image signal;
   (b) detecting the incident light from said subject by said image pickup sensor when the auxiliary light is emitted to said subject, thereby obtaining a second image signal;
   (c) calculating a differential signal between said first image signal and said second image signal;
   (d) calculating distance information to said subject based on said differential signal;
   (e) controlling an AF operation of said optical system based on said distance information calculated in said step (d); and
   (f) calculating a reflectance of said subject based on said first image signal after said step (a), wherein
   said step (d) is a step of calculating said distance information using said reflectance calculated at said step (f) under the condition that intensity of said auxiliary light attenuates in accordance with the inverse-square law.

5. The AF control method according to claim 4, further comprising a step of
  (g) detecting a low brightness region having a brightness value of less than a predetermined threshold from an AF area set for one frame of said first image signal, after said step (a), wherein
  said step (d) is a step of calculating said distance information based on said AF area after removal of said low brightness region.

6. An AF control method for executing AF (automatic focusing) control of an optical system mounted in a camera, comprising the steps of:
  (a) detecting an incident light from a subject by an image pickup sensor without emitting an auxiliary light to said subject, thereby obtaining a first image signal;
  (b) detecting the incident light from said subject by said image pickup sensor when the auxiliary light is emitted to said subject, thereby obtaining a second image signal;
  (c) calculating a differential signal between said first image signal and said second image signal;
  (d) calculating distance information to said subject based on said differential signal;
  (e) controlling an AF operation of said optical system based on said distance information calculated in said step (d);
  (f) calculating a reflectance of said subject based on said first image signal after said step (a), wherein
  said step (d) is a step of calculating said distance information using said reflectance calculated at said step (f) under the condition that intensity of said auxiliary light attenuates in accordance with the inverse-square law; and
  wherein said step (f) includes the steps of:
    calculating an average brightness of one frame of said first image signal and an average brightness of a given AF area set for said one frame; and
    calculating said reflectance corresponding to said average brightness of said AF area using a predetermined reference reflectance in corresponding with said average brightness of one frame.

7. An AF control method for executing AF (automatic focusing) control of an optical system mounted in a camera, comprising the steps of:
  (a) detecting an incident light from a subject by an image pickup sensor without emitting an auxiliary light to said subject, thereby obtaining a first image signal;
  (b) detecting the incident light from said subject by said image pickup sensor when the auxiliary light is emitted to said subject, thereby obtaining a second image signal;
  (c) calculating a differential signal between said first image signal and said second image signal;
  (d) calculating distance information to said subject based on said differential signal;
  (e) controlling an AF operation of said optical system based on said distance information calculated in said step (d);
  (f) calculating a reflectance of said subject based on said first image signal after said step (a), wherein
  said step (d) is a step of calculating said distance information using said reflectance calculated at said step (f) under the condition that intensity of said auxiliary light attenuates in accordance with the inverse-square law; and
  wherein a data base for storing a probability of occurrence of an event that an image area having a given image size includes a shade part is prepared, said probability of occurrence having two variables: average brightness of a center part in said image area; and average brightness of a peripheral part, and
  said step (f) includes the steps of: calculating an average brightness of said center part and an average brightness of said peripheral part of said image area included in said AF area, and acquiring said probability of occurrence having said average brightnesses as two variables from said data base, thereby correcting said reflectance based on said probability of occurrence.

8. An AF control method for executing AF (automatic focusing) control of an optical system mounted in a camera, comprising the steps of:
  (a) detecting an incident light from a subject by an image pickup sensor without emitting an auxiliary light to said subject, thereby obtaining a first image signal;
  (b) detecting the incident light from said subject by said image pickup sensor when the auxiliary light is emitted to said subject, thereby obtaining a second image signal;
  (c) calculating a differential signal between said first image signal and said second image signal;
  (d) calculating distance information to said subject based on said differential signal;
  (e) controlling an AF operation of said optical system based on said distance information calculated in said step (d);
  (f) calculating a reflectance of said subject based on said first image signal after said step (a); and
  (g) detecting a low brightness region having a brightness value of less than a predetermined threshold from an AF area set for one frame of said first image signal, after said step (a), wherein
  said step (d) is a step of calculating said distance information based on said AF area after removal of said low brightness region,
  said step (d) is a step of calculating said distance information using said reflectance calculated at said step (f) under the condition that intensity of said auxiliary light attenuates in accordance with the inverse-square law; and
  said step (f) includes the steps of:
    calculating an average brightness of one frame of said first image signal and an average brightness of a given AF area set for said one frame; and
    calculating said reflectance corresponding to said average brightness of said AF area using a predetermined reference reflectance in corresponding with said average brightness of one frame.

9. An AF control method for executing AF (automatic focusing) control of an optical system mounted in a camera, comprising the steps of:
  (a) detecting an incident light from a subject by an image pickup sensor without emitting an auxiliary light to said subject, thereby obtaining a first image signal;
  (b) detecting the incident light from said subject by said image pickup sensor when the auxiliary light is emitted to said subject, thereby obtaining a second image signal;
  (c) calculating a differential signal between said first image signal and said second image signal;
  (d) calculating distance information to said subject based on said differential signal;
  (e) controlling an AF operation of said optical system based on said distance information calculated in said step (d);

(f) calculating a reflectance of said subject based on said first image signal after said step (a); and
(g) detecting a low brightness region having a brightness value of less than a predetermined threshold from an AF area set for one frame of said first image signal, after said step (a), wherein said step (d) is a step of calculating said distance information based on said AF area after removal of said low brightness region, said step (d) is a step of calculating said distance information using said reflectance calculated at said step (f) under the condition that intensity of said auxiliary light attenuates in accordance with the inverse-square law, a data base for storing a probability of occurrence of an event that an image area having a given image size includes a shade part is prepared, said probability of occurrence having two variables: average brightness of a center part in said image area; and average brightness of a peripheral part, and said step (f) includes the steps of: calculating an average brightness of said center part and an average brightness of said peripheral part of said image area included in said AF area, and acquiring said probability of occurrence having said average brightnesses as two variables from said data base, thereby correcting said reflectance based on said probability of occurrence.

* * * * *